US010322804B2

(12) United States Patent
Maekawa

(10) Patent No.: US 10,322,804 B2
(45) Date of Patent: *Jun. 18, 2019

(54) DEVICE THAT CONTROLS FLIGHT ALTITUDE OF UNMANNED AERIAL VEHICLE

(71) Applicant: PANASONIC INTELLECTUAL PROPERTY CORPORATION OF AMERICA, Torrance, CA (US)

(72) Inventor: Hajime Maekawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/013,187

(22) Filed: Jun. 20, 2018

(65) Prior Publication Data

US 2018/0312256 A1 Nov. 1, 2018

Related U.S. Application Data

(63) Continuation of application No. 15/387,576, filed on Dec. 21, 2016, now Pat. No. 10,029,790.

(30) Foreign Application Priority Data

Jan. 28, 2016 (JP) .................................. 2016-014124
Sep. 8, 2016 (JP) .................................. 2016-175206

(51) Int. Cl.
*B64C 39/02* (2006.01)
*G05D 1/00* (2006.01)
(Continued)

(52) U.S. Cl.
CPC ......... *B64C 39/024* (2013.01); *G05D 1/0094* (2013.01); *G05D 1/042* (2013.01);
(Continued)

(58) Field of Classification Search
CPC ............ B64C 39/024; B64C 2201/024; B64C 2201/127; G05D 1/042; G05D 1/0094;
(Continued)

(56) References Cited

U.S. PATENT DOCUMENTS 6,130,705 A 10/2000 Lareau
8,581,981 B2 11/2013 Alley
(Continued)

FOREIGN PATENT DOCUMENTS

JP 2006-027331 2/2006

OTHER PUBLICATIONS

Smyczynski et al., Autonomous drone control system for object tracking: Flexible system design with implementation example, IEEE, p. 734-738 (Year: 2017).
(Continued)

*Primary Examiner* — McDieunel Marc
(74) *Attorney, Agent, or Firm* — Greenblum & Bernstein, P.L.C.

(57) ABSTRACT

A device controls a movement direction of an unmanned aerial vehicle having mounted thereon an imaging device that captures an image. The device includes one or more memories and a processor which, in operation, recognizes, as a plurality of markers, a plurality of objects from the image captured by the imaging device, each of the plurality of markers attached to one of the plurality of objects. The processor further calculates an area of a polygon formed by the plurality of markers, and controls the movement direction of the unmanned aerial vehicle such that the area of the polygon is maximized.

13 Claims, 13 Drawing Sheets

(51) Int. Cl.
*H04N 5/232* (2006.01)
*G05D 1/04* (2006.01)

(52) U.S. Cl.
CPC ..... *H04N 5/23203* (2013.01); *H04N 5/23296* (2013.01); *B64C 2201/024* (2013.01); *B64C 2201/027* (2013.01); *B64C 2201/123* (2013.01); *B64C 2201/127* (2013.01)

(58) Field of Classification Search
CPC ...... G05D 1/101; G05D 1/0214; G01C 11/02; G01C 21/005; G01C 3/08; G06T 7/20; B64F 1/00; H04N 7/185
See application file for complete search history.

(56) References Cited

U.S. PATENT DOCUMENTS

| | | | |
|---|---|---|---|
| 8,855,846 B2 | 10/2014 | Grzywna | |
| 9,025,825 B2 | 5/2015 | Saund | |
| 9,075,415 B2 | 7/2015 | Kugelmass | |
| 9,317,036 B2 | 4/2016 | Wang | |
| 9,412,278 B1 | 8/2016 | Gong | |
| 9,429,425 B2 | 8/2016 | Tillmann | |
| 9,508,263 B1 | 11/2016 | Teng | |
| 9,792,613 B2 | 10/2017 | Gong | |
| 9,805,372 B2 | 10/2017 | Gong | |
| 9,805,607 B2 | 10/2017 | Gong | |
| 9,889,932 B2* | 2/2018 | Sharma | B64C 39/024 |
| 10,029,790 B2* | 7/2018 | Maekawa | B64C 39/024 |
| 2014/0180914 A1 | 6/2014 | Abhyanker | |
| 2014/0257595 A1 | 9/2014 | Tillmann | |
| 2015/0353206 A1 | 12/2015 | Wang | |
| 2016/0332748 A1 | 11/2016 | Wang | |
| 2017/0017240 A1* | 1/2017 | Sharma | B64C 39/024 |
| 2017/0031369 A1* | 2/2017 | Liu | G05D 1/102 |
| 2017/0169713 A1 | 6/2017 | Gong | |
| 2017/0248969 A1 | 8/2017 | Ham | |
| 2017/0269597 A1 | 9/2017 | Maekawa | |

OTHER PUBLICATIONS

Samad et al., The potential of Unmanned Aerial Vehicle (UAV) for civilian and mapping application, IEEE, p. 313-318 (Year: 2013).

Chiu et al., Vision-Only Automatic Flight Control for Small UAVs, IEEE, p. 2425-2437 (Year: 2011).

Zhang et al., Vision-based relative altitude estimation of small unmanned aerial vehicles in target localization, IEEE, p. 4622-4627 (Year: 2011).

* cited by examiner

| REGISTERED MARKER NUMBER | 5 |

| MARKER ID | X | Y |
|---|---|---|
| 1 | NORTH LATITUDE 34° 44′ 19″ | EAST LONGITUDE 135° 34′ 26″ |
| 2 | NORTH LATITUDE 34° 44′ 20″ | EAST LONGITUDE 135° 34′ 25″ |
| 3 | NORTH LATITUDE 34° 44′ 19″ | EAST LONGITUDE 135° 34′ 29″ |
| 4 | NORTH LATITUDE 34° 44′ 17″ | EAST LONGITUDE 135° 34′ 29″ |
| | | |

DEVICE THAT CONTROLS FLIGHT ALTITUDE OF UNMANNED AERIAL VEHICLE

CROSS REFERENCE TO RELATED APPLICATIONS

This is a continuation application of U.S. patent application Ser. No. 15/387,576, filed Dec. 21, 2016, which claims the benefit of Japanese Patent Application No. 2016-014124, filed Jan. 28, 2016, and upon Japanese Application No. 2016-175206, filed Sep. 8, 2016. The entire disclosure of each of the above-identified applications, including the specification, drawings, and claims, is incorporated herein by reference in its entirety.

BACKGROUND

1. Technical Field

The present disclosure relates to a flight altitude control device that controls the flight altitude of an unmanned aerial vehicle having mounted thereon an imaging device that captures images of the ground, and relates to an unmanned aerial vehicle, a flight altitude control method, and a recording medium having recorded thereon a flight altitude control program.

2. Description of the Related Art

As a conventional method for controlling the flight of an unmanned aerial vehicle, a human operator generally operates the unmanned aerial vehicle while observing the unmanned aerial vehicle, and the flight altitude at the time of operating is controlled according to the observations of the operator.

Furthermore, conventional methods for controlling the flight altitude of an unmanned aerial vehicle include controlling a hovering operation at a preset altitude (for example, see Japanese Unexamined Patent Application Publication No. 2006-27331). A method for collecting aerial image information described in this Japanese Unexamined Patent Application Publication No. 2006-27331 discloses a technique for controlling flight by measuring the distance (altitude) between a reference point on the ground and an unmanned aerial vehicle.

SUMMARY

However, further improvement is required in the aforementioned method for collecting aerial image information.

In one general aspect, the techniques disclosed here feature a device that controls the flight altitude of an unmanned aerial vehicle having mounted thereon an imaging device that captures an image of the ground, the device being provided with: one or more memories; and circuitry which, in operation, recognizes, as a plurality of markers, a plurality of objects located on the ground from the image captured by the imaging device, calculates the area of a polygon formed by the plurality of markers, and controls the flight altitude of the unmanned aerial vehicle in such a way that the area of the polygon is maximized.

It should be noted that general or specific aspects hereof may be realized by a device, a system, an integrated circuit, a computer program, or a recording medium such as a computer-readable CD-ROM, and may be realized by any combination of a device, a system, a method, a computer program, and a recording medium.

According to the present disclosure, it is possible to automatically adjust the flight altitude of an unmanned aerial vehicle, and to appropriately capture an image of an object on the ground serving as an imaging subject.

It should be noted that further effects and advantages of the present disclosure will become apparent from the details disclosed in the present specification and drawings. Additional benefits and/or advantages may be individually obtained by the various embodiments and features of the specification and drawings, which need not all be provided in order to obtain one or more of such benefits and/or advantages.

Figure 1:
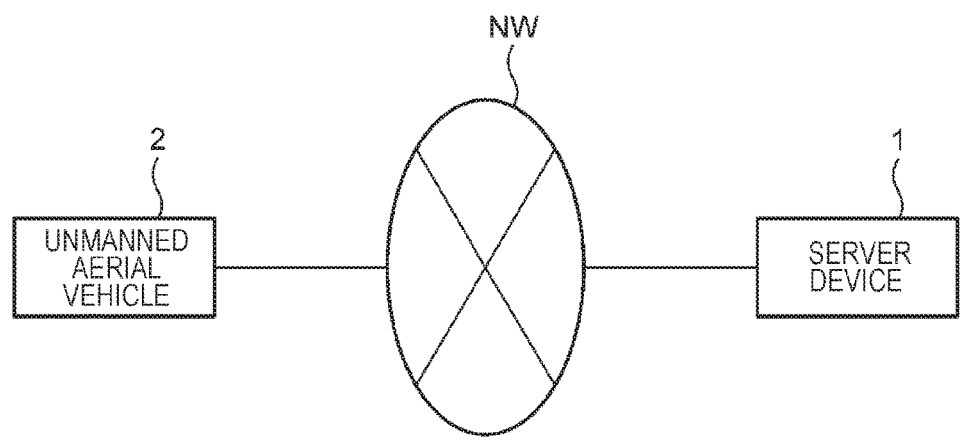
FIG. 1 is a block diagram depicting an example of a configuration of a flight altitude control system in embodiment 1 of the present disclosure.

DETAILED DESCRIPTION (Findings Forming the Basis for the Present Disclosure)

The present disclosure relates to a flight altitude control system for controlling the flight altitude of an unmanned aerial vehicle having mounted thereon an imaging device (for example, a camera). This flight altitude control system is used when, for example, robots, people, or the like deployed/positioned on the ground carry out activities such as rescues in a disaster-affected area at the time of a disaster or the like, in order for an unmanned aerial vehicle flying over the disaster-affected area to capture images of the disaster-affected area using a camera, and to share information regarding the disaster-affected area required for the activities on the basis of the captured images.

When a plurality of robots or people carry out activities in a cooperative manner, it is necessary to comprehend the statuses of these robots or people themselves, the situations around these robots or people, and so forth. That is, it is necessary to acquire required information for which the robots, people, or the like deployed/positioned on the ground serve as imaging subjects.

In order to appropriately capture an image of ground to be observed such as a disaster-affected area by using a camera mounted on an unmanned aerial vehicle, it is necessary to determine an altitude that allows appropriate imaging of a region of interest the user wishes to capture, and to control the flight altitude of the unmanned aerial vehicle. However, when the observation subject is a region for which there is no existing map or a region for which the most up-to-date status is unclear such as a disaster-affected area, it is difficult to decide an appropriate route or altitude in advance.

In the aforementioned conventional method for collecting aerial image information, a predetermined distance is maintained in accordance with the distance to a reference point, and in order to appropriately capture an image of an object on the ground serving as an imaging subject, the user has to set an appropriate altitude in advance. Therefore, when the observation subject is a region for which there is no existing map or a region for which the most up-to-date status is unclear such as a disaster-affected area, there has been a problem in that it has not been possible to appropriately capture an image of an object on the ground serving as an imaging subject.

A method according to an aspect of the present disclosure includes: recognizing, as a plurality of markers, a plurality of objects located on the ground from an image captured by an imaging device mounted on an unmanned aerial vehicle; calculating the area of a polygon formed by the plurality of markers; and controlling the flight altitude of the unmanned aerial vehicle in such a way that the area of the polygon is maximized. Thus, the flight altitude of the unmanned aerial vehicle is automatically adjusted, and it therefore becomes possible for the camera mounted on the unmanned aerial vehicle to appropriately capture an image of a region of interest decided in accordance with the markers, as a region in which all of the objects to be captured are enlarged to the greatest extent from among objects on the ground such as robots or people.

A device according to an aspect of the present disclosure controls the flight altitude of an unmanned aerial vehicle having mounted thereon an imaging device that captures an image of the ground, the device being provided with: one or more memories; and circuitry which, in operation, recognizes, as a plurality of markers, a plurality of objects located on the ground from the image captured by the imaging device, calculates the area of a polygon formed by the plurality of markers, and controls the flight altitude of the unmanned aerial vehicle in such a way that the area of the polygon is maximized.

According to this kind of configuration, due to the plurality of objects located on the ground being recognized as a plurality of markers from the image captured by the imaging device, the area of the polygon formed by the plurality of markers being calculated, and the flight altitude of the unmanned aerial vehicle being controlled in such a way that the area of the polygon is maximized, it is possible to appropriately capture a region of interest designated by the markers on the ground. As a result, it is possible to automatically adjust the flight altitude of the unmanned aerial vehicle, and to appropriately capture an image of the objects on the ground serving as imaging subjects.

The device may be further provided with: a first memory that stores the number of the markers to be recognized by the circuitry, as a registered marker number, in which the circuitry may compare the number of the plurality of markers and the registered marker number, and, when the number of the plurality of markers is less than the registered marker number, perform control that increases the flight altitude of the unmanned aerial vehicle, and, when the number of the plurality of markers matches the registered marker number, and the area of the polygon is smaller than the area of the polygon previously calculated, perform control that decreases the flight altitude of the unmanned aerial vehicle.

According to this kind of configuration, when the number of the plurality of markers recognized and the registered marker number stored in advance are compared and the number of the plurality of markers is less than the registered marker number, control that increases the flight altitude of the unmanned aerial vehicle is performed, and therefore, by raising the unmanned aerial vehicle, it is possible to increase the number of captured markers to match the registered marker number, and to appropriately capture an image of a region of interest designated by the registered marker number. Furthermore, when the number of the plurality of markers matches the registered marker number, and the area of the polygon is smaller than the area of the polygon previously calculated, control that decreases the flight altitude of the unmanned aerial vehicle is performed, and therefore, by lowering the unmanned aerial vehicle, it is possible to appropriately capture an image of a region of interest designated by the registered marker number, with the region of interest having been enlarged as much as possible.

The imaging device may include a zoom imaging device capable of a zoom operation, and the circuitry, when the number of the plurality of markers matches the registered marker number, and the area of the polygon is equal to or larger than the area of the polygon previously calculated, may perform control that maintains the flight altitude of the unmanned aerial vehicle at the present flight altitude, recognize the plurality of objects as the plurality of markers, from the image captured by the imaging device while the flight altitude of the unmanned aerial vehicle is maintained at the present flight altitude, calculate, as an altitude-maintained area, the area of the polygon formed by the plurality of markers recognized while the flight altitude of the unmanned aerial vehicle is maintained at the present flight altitude, and control the zoom ratio of the zoom imaging device in such a way that the altitude-maintained area is maximized.

According to this kind of configuration, when the number of the plurality of markers matches the registered marker number, and the area of the polygon is equal to or larger than the area of the polygon previously calculated, control that maintains the flight altitude of the unmanned aerial vehicle at the present flight altitude is performed, the plurality of objects are recognized as the plurality of markers, from the image captured by the imaging device while the flight altitude of the unmanned aerial vehicle is maintained at the present flight altitude, the area of the polygon formed by the plurality of markers recognized while the flight altitude of the unmanned aerial vehicle is maintained at the present flight altitude is calculated as the altitude-maintained area, and the zoom ratio of the zoom imaging device is controlled in such a way that the altitude-maintained area is maximized, and therefore, due to the zoom ratio of the zoom imaging device being controlled while the flight altitude of the unmanned aerial vehicle is maintained, it is possible to appropriately capture an image of the region of interest designated by the registered marker number.

When the number of the plurality of markers recognized while the flight altitude of the unmanned aerial vehicle is maintained at the present flight altitude is less than the registered marker number, the circuitry may control the zoom imaging device in such a way that the zoom imaging device zooms out.

According to this kind of configuration, when the number of the plurality of markers recognized while the flight altitude of the unmanned aerial vehicle is maintained at the present flight altitude is less than the registered marker number, the zoom imaging device zooms out, and therefore, due to the zoom-out operation of the zoom imaging device, it is possible to increase the number of the captured markers to match the registered marker number, and to appropriately capture an image of the region of interest designated by the number of registered markers.

When the zoom imaging device cannot zoom out, the circuitry may perform control that maintains the present zoom ratio of the zoom imaging device, and perform control that increases the flight altitude of the unmanned aerial vehicle.

According to this kind of configuration, when the zoom imaging device cannot zoom out, control that increases the flight altitude of the unmanned aerial vehicle is performed while control that maintains the present zoom ratio of the zoom imaging device is performed, and therefore, by raising the unmanned aerial vehicle, it is possible to increase the number of captured markers to the registered marker number, and to appropriately capture an image of the region of interest designated by the registered marker number, even when the zoom imaging device cannot zoom out.

When the number of the plurality of markers recognized while the flight altitude of the unmanned aerial vehicle is maintained at the present flight altitude matches the registered marker number, and the altitude-maintained area is smaller than the altitude-maintained area previously calculated, the circuitry may control the zoom imaging device in such a way that the zoom imaging device zooms in.

According to this kind of configuration, when the number of the plurality of markers recognized while the flight altitude of the unmanned aerial vehicle is maintained at the present flight altitude matches the registered marker number, and the present altitude-maintained area is smaller than the altitude-maintained area previously calculated, the zoom imaging device zooms in, and therefore, due to the zoom-in operation of the zoom imaging device, it is possible to appropriately capture an image of the region of interest designated by the registered marker number, with the region of interest having been enlarged as much as possible.

When the zoom imaging device cannot zoom in, the circuitry may perform control that maintains the present zoom ratio of the zoom imaging device, and perform control that decreases the flight altitude of the unmanned aerial vehicle.

According to this kind of configuration, when the zoom imaging device cannot zoom in, control that decreases the flight altitude of the unmanned aerial vehicle is performed while control that maintains the present zoom ratio of the zoom imaging device is performed, and therefore, by lowering the unmanned aerial vehicle, it is possible to appropriately capture an image of the region of interest designated by the registered marker number, with the region of interest having been enlarged as much as possible.

The circuitry may acquire, as a plurality of recognition-subject markers, a plurality of objects selected by a user from among the plurality of objects, recognize the plurality of recognition-subject markers as the plurality of markers, from the image captured by the imaging device, and calculate the area of the polygon formed by the plurality of recognition-subject markers.

According to this kind of configuration, the plurality of objects selected by the user from among the plurality of objects are acquired as a plurality of recognition-subject markers, the plurality of recognition-subject markers are recognized as the plurality of markers, from an image captured by the imaging device, and the area of the polygon formed by the plurality of recognition-subject markers is calculated, and it is therefore possible to appropriately capture an image of the region of interest designated by the plurality of objects selected by the user.

The circuitry may acquire, as the plurality of recognition-subject markers, the plurality of markers selected by the user from among the plurality of markers, which are displayed superimposed on the image captured by the imaging device.

According to this kind of configuration, a plurality of markers are displayed superimposed on a captured image, and a plurality of markers selected by the user from among the plurality of displayed markers are acquired as a plurality of recognition-subject markers, and therefore the user can easily designate a desired region as a region of interest by the simple operation of selecting arbitrary markers from a captured image.

An unmanned aerial vehicle according to another aspect of the present disclosure is provided with: an imaging device that captures an image of the ground; and circuitry which, in operation, recognizes, as a plurality of markers, a plurality of objects located on the ground from the image captured by the imaging device, calculates the area of a polygon formed by the plurality of markers, and controls the flight altitude of the unmanned aerial vehicle in such a way that the area of the polygon is maximized. In this case, the same effect as that of the aforementioned device can be demonstrated.

Furthermore, it is possible for the present disclosure to not only be realized as a device or an unmanned aerial vehicle provided with a characteristic configuration such as that mentioned above, but to also be realized as a method or the like for executing characteristic processing corresponding to the characteristic configuration provided in the device. Furthermore, it is also possible for the present disclosure to be realized as a recording medium having recorded thereon a computer program that causes a computer to execute the characteristic processing included in this kind of method. Consequently, the same effect as that of the aforementioned device can be demonstrated also in the other aspects described below.

A method according to another aspect of the present disclosure includes: recognizing, as a plurality of markers, a plurality of objects located on the ground from an image captured by an imaging device mounted on an unmanned aerial vehicle; calculating the area of a polygon formed by the plurality of markers; and controlling the flight altitude of the unmanned aerial vehicle in such a way that the area of the polygon is maximized.

A recording medium according to another aspect of the present disclosure is a computer-readable non-transitory recording medium having recorded thereon a program that controls an unmanned aerial vehicle having mounted thereon an imaging device that captures an image of the ground, in which the program, when executed by a processor, causes the processor to execute a method including: recognizing, as a plurality of markers, a plurality of objects located on the ground from the image captured by the imaging device; calculating the area of a polygon formed by the plurality of markers; and controlling the flight altitude of the unmanned aerial vehicle in such a way that the area of the polygon is maximized.

Also, it goes without saying a computer program such as the aforementioned can be distributed by way of a computer-readable non-transitory recording medium such as a CD-ROM or a communication network such as the Internet. Furthermore, the present disclosure may be configured as a system in which some constituent elements and other constituent elements of a flight altitude control device according to an embodiment of the present disclosure are distributed among a plurality of computers.

It should be noted that the embodiments described hereinafter are all intended to represent a specific example of the present disclosure. The numerical values, the shapes, the constituent elements, the steps, the order of the steps, and the like given in the following embodiments are examples and are not intended to restrict the present disclosure. Furthermore, from among the constituent elements in the following embodiments, constituent elements that are not described in the independent claims indicating the most significant concepts are described as optional constituent elements. Furthermore, in all of the embodiments, it is also possible to combine the respective content thereof.

Hereafter, embodiments of the present disclosure will be described with reference to the drawings.

Embodiment 1

A flight altitude control system according to embodiment 1 of the present disclosure uses autonomous mobile robots positioned on the ground (ground-based robots) as markers, and controls the flight altitude of an unmanned aerial vehicle in such a way that an imaging device mounted on the unmanned aerial vehicle captures all of the markers in an image taken by the imaging device.

FIG. 1 is a block diagram depicting an example of a configuration of the flight altitude control system in embodiment 1 of the present disclosure. The flight altitude control system depicted in FIG. 1 is provided with a server device 1 and an unmanned aerial vehicle 2, and the server device 1 and the unmanned aerial vehicle 2 are connected via a wired or wireless network NW and configured in such a way that a variety of information can be mutually communicated. It should be noted that, when a user (operator) remotely controls the unmanned aerial vehicle 2 using an external control device (controller), the controller is also connected via the network NW or the like and configured in such a way that a variety of information can be mutually communicated. The same is also true for other embodiments.

The server device 1 is provided with a function serving as a flight altitude control device. Specifically, the server device 1 receives an image captured by a camera, which is an example of the imaging device mounted on the unmanned aerial vehicle 2, via the network NW, determines the flight altitude of the unmanned aerial vehicle 2, and controls the flight altitude of the unmanned aerial vehicle 2.

Figure 2:
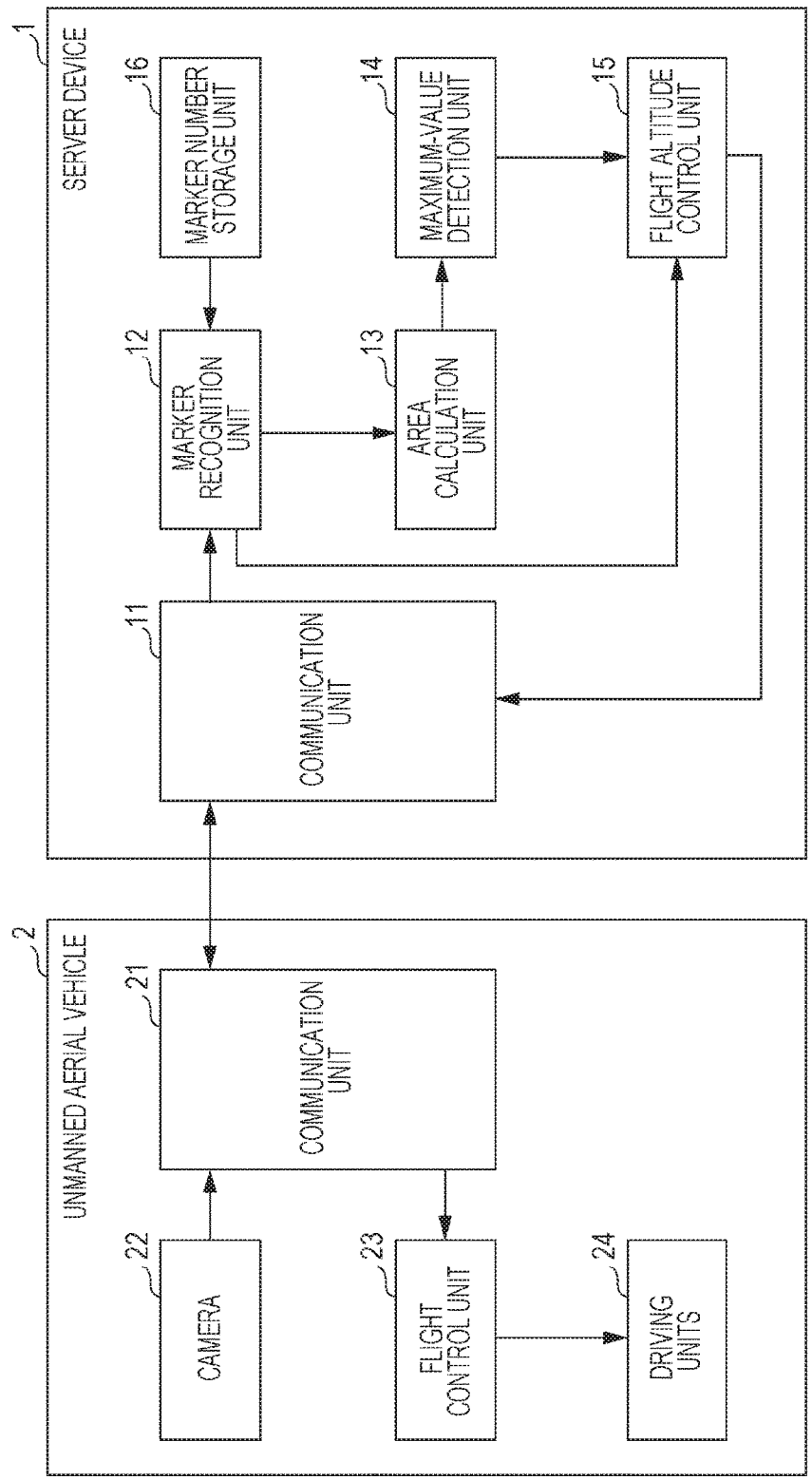
FIG. 2 is a block diagram depicting an example of a configuration of a server device and an unmanned aerial vehicle depicted in FIG. 1.
Figures 3, 4:
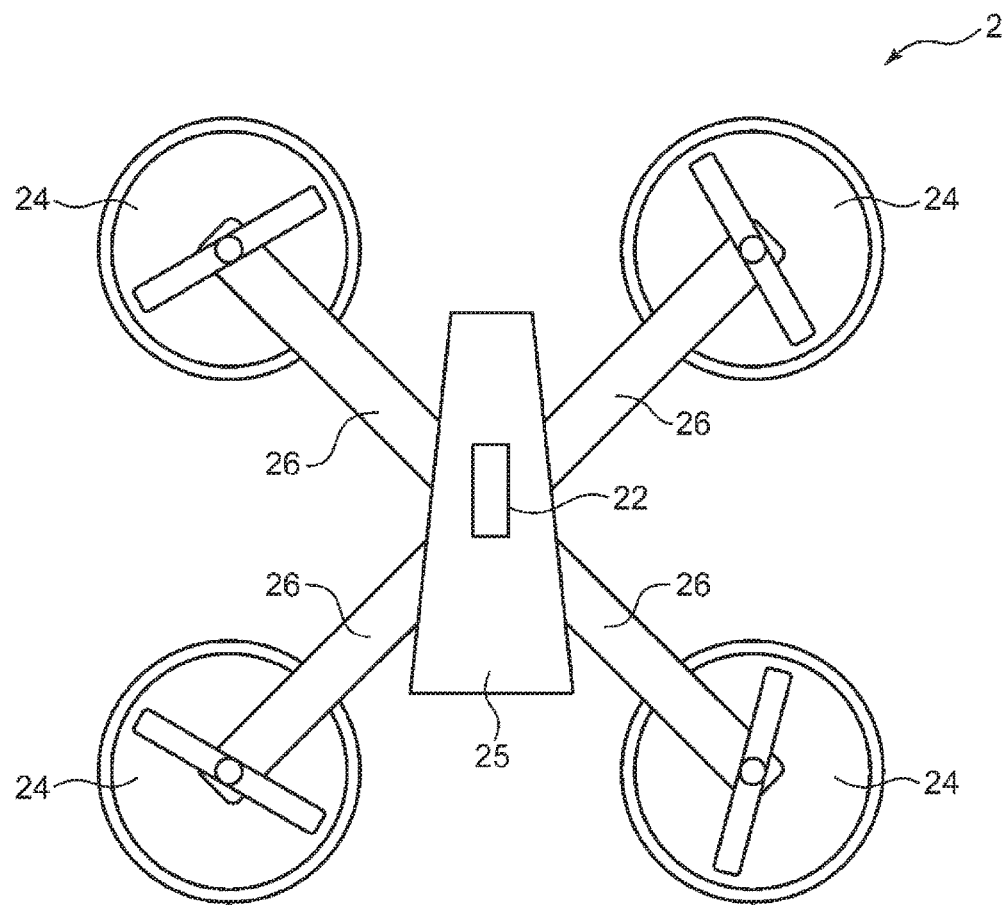
FIG. 3 is a diagram depicting an example of the external appearance of the unmanned aerial vehicle depicted in FIG. 2.
FIG. 4 is a diagram depicting an example of data retained by a marker number storage unit depicted in FIG. 2.

FIG. 2 is a block diagram depicting an example of a configuration of the server device 1 and the unmanned aerial vehicle 2 depicted in FIG. 1, and FIG. 3 is a diagram depicting an example of the external appearance of the unmanned aerial vehicle depicted in FIG. 2. It should be noted that, in order to simplify the diagram, the network NW has not been depicted in FIG. 2. The same is also true for other embodiments.

In FIG. 2, the server device 1 is provided with a communication unit 11, a marker recognition unit 12, an area calculation unit 13, a maximum-value detection unit 14, a flight altitude control unit 15, and a marker number storage unit 16. The unmanned aerial vehicle 2 is provided with a communication unit 21, a camera 22, a flight control unit 23, and driving units 24.

The communication unit 21 of the unmanned aerial vehicle 2, via the network NW (not depicted), communicates with the communication unit 11 of the server device 1, transmits an image or the like captured by the camera 22 to the communication unit 11, and receives various control commands or the like generated by the server device 1 from the communication unit 11.

The camera 22 is mounted on the unmanned aerial vehicle 2, and captures images of objects, for example, ground-based robots, that serve as markers deployed below the unmanned aerial vehicle 2. Here, as the camera 22, an example is given in which a camera having a fixed-focus lens is used. The camera 22 transmits a captured image (image data) to the communication unit 11 via the communication unit 21.

Here, referring to FIG. 3, the unmanned aerial vehicle 2 is provided with, in addition to the above configuration, a main body 25, four support units 26, and four driving units 24 (the driving units 24 depicted in FIG. 2) that generate a driving force for the unmanned aerial vehicle 2. It should be noted that, in order to simplify the diagram, the four driving units 24 are depicted as one block in FIG. 2. The same is also true for other embodiments.

The camera 22 is attached to the bottom section of the main body 25. The driving units 24 are attached to the tip ends of the support units 26, which extend in four directions from the main body 25. The communication unit 21 and the flight control unit 23 depicted in FIG. 2 are housed inside the main body 25.

Referring to FIG. 2 once again, the flight control unit 23 controls the flight state including the flight altitude of the unmanned aerial vehicle 2. The driving units 24 are made up of a propeller and a motor that rotates the propeller. The flight control unit 23 controls the movement direction, the flight altitude, and the like of the unmanned aerial vehicle 2 by appropriately controlling the rotational speed of the propellers of the driving units 24. In FIG. 3, the unmanned aerial vehicle 2 has the four driving units 24; however, it should be noted that the unmanned aerial vehicle 2 is not restricted thereto and may use five or more driving units, for example. The same is also true for other embodiments.

The marker recognition unit 12 of the server device 1 acquires an image captured by the camera 22 via the communication unit 21, and recognizes, as markers, ground-based robots captured by the camera 22. For example, the marker recognition unit 12 is configured of an image processing device that recognizes objects such as people or ground-based robots, and by attaching specific lamps or light-emitting bodies to the ground-based robots or people to serve as markers and making the lamps or the light-emitting bodies light up or blink, the lamps or the light-emitting bodies are detected from an image captured by the camera 22 and the ground-based robots or people are recognized as markers.

It should be noted that the configuration of the marker recognition unit 12 is not particularly restricted to the aforementioned example, and may be implemented in such a way that a mark like a bar code such as OR code (registered trademark) is arranged on or affixed to objects such as people or ground-based robots, the bar code-like marks are detected, and the objects such as the ground-based robots or people are recognized as markers. Furthermore, the objects that are recognized as markers are not particularly restricted to the aforementioned examples, and may be various types of work robots, emergency vehicles (fire engines, ambulances, police vehicles, or the like), construction vehicles (bulldozers, excavators, cranes, or the like), or the like. The same is also true for other embodiments.

The marker number storage unit 16 stores a preset number of markers as a registered marker number. FIG. 4 is a diagram depicting an example of data retained by the marker number storage unit 16. As depicted in FIG. 4, the number of ground-based robots deployed on the ground is stored in the marker number storage unit 16 in advance, and in the present example, "5" is stored as the registered marker number, for example.

The marker recognition unit 12 compares the number of the plurality of recognized markers and the registered marker number stored in the marker number storage unit 16, outputs the comparison result to the flight altitude control unit 15, and also outputs the image captured by the camera 22 and the comparison result to the area calculation unit 13.

When the number of markers recognized by the marker recognition unit 12 matches the registered marker number registered in advance in the marker number storage unit 16, the area calculation unit 13 detects the positions of the markers using the image captured by the camera 22, calculates the area of a polygon formed by the number of markers that matches the registered marker number, and outputs the calculated area of the polygon to the maximum-value detection unit 14. Here, various types of areas can be used as the area of a polygon; for example, the area of a polygon on the image formed by the markers may be calculated, or the actual area of a polygon formed from the actual positions of the ground-based robots that correspond to the markers may be calculated.

The maximum-value detection unit 14 detects whether or not the area of the polygon calculated by the area calculation unit 13 is the maximum, while the flight altitude of the unmanned aerial vehicle 2 is controlled by the flight altitude control unit 15. Specifically, the maximum-value detection unit 14 has a function to store the area of the polygon calculated by the area calculation unit 13, performs processing that compares the previous area of the polygon and the most up-to-date area of the polygon to detect the maximum value, and outputs the comparison result to the flight altitude control unit 15.

The flight altitude control unit 15 controls the flight altitude of the unmanned aerial vehicle 2 on which the camera 22 is mounted, in such a way that the area of the polygon is maximized, on the basis of the comparison result of the marker recognition unit 12 and the comparison result of the maximum-value detection unit 14. Specifically, when the number of the plurality of markers recognized by the marker recognition unit 12 is less than the registered marker number, the flight altitude control unit 15 creates a control command for controlling the flight altitude of the unmanned aerial vehicle 2 in such a way that the flight altitude of the unmanned aerial vehicle 2 is increased, and transmits the created control command to the unmanned aerial vehicle 2 via the communication unit 11. Furthermore, when the number of the plurality of markers matches the registered marker number, and the area of the polygon is smaller than the area of the polygon previously calculated, the flight altitude control unit 15 creates a control command for controlling the flight altitude of the unmanned aerial vehicle 2 in such a way that the flight altitude of the unmanned aerial vehicle 2 is decreased, and transmits the created control command to the unmanned aerial vehicle 2 via the communication unit 11.

The communication unit 21 of the unmanned aerial vehicle 2 receives the control command from the server device 1 and outputs the control command to the flight control unit 23. The flight control unit 23 controls the driving units 24 according to the control command, and increases the flight altitude of the unmanned aerial vehicle 2 when the number of the plurality of markers recognized by the marker recognition unit 12 is less than the registered marker number. Furthermore, the flight control unit 23 decreases the flight altitude of the unmanned aerial vehicle 2 when the number of the plurality of markers matches the registered marker number and the area of the polygon is smaller than the area of the polygon previously calculated.

As mentioned above, the flight altitude control unit 15 of the server device 1 transmits a command (control command) for controlling altitude to the unmanned aerial vehicle 2, and the unmanned aerial vehicle 2 controls the altitude thereof according to the received command. Furthermore, the server device 1 receives the image captured by the camera 22 of the unmanned aerial vehicle 2, and provides an analysis result obtained using the received image, to various devices or the like (not depicted) as information that is necessary for the plurality of ground-based robots to carry out activities in a cooperative manner.

In the present embodiment, an example in which the server device 1 functions as a flight altitude control device has been described; however, it should be noted that a configuration in which the unmanned aerial vehicle 2 is provided with a function serving as a flight altitude control device may be implemented. In this case, the unmanned aerial vehicle 2 is further provided with the marker recognition unit 12, the area calculation unit 13, the maximum-value detection unit 14, the flight altitude control unit 15, and the marker number storage unit 16, and controls the altitude thereof using an image captured by the camera 22 mounted thereon. Furthermore, a control device which is external to an unmanned aerial vehicle that is connected wirelessly or by means of optical communication or the like, for example, a PROPO controller, may also function as a flight altitude control device. The same is also true for other embodiments.

According to the above configuration, the unmanned aerial vehicle 2 is constantly capturing images of below the position where the unmanned aerial vehicle 2 is flying, by means of the camera 22. The plurality of ground-based robots that serve as markers are deployed on the ground below the unmanned aerial vehicle 2, and, due to the camera 22 capturing an image thereof, the server device 1 generates a polygon in which the positions of the ground-based robots serve as vertices.

Figure 5:
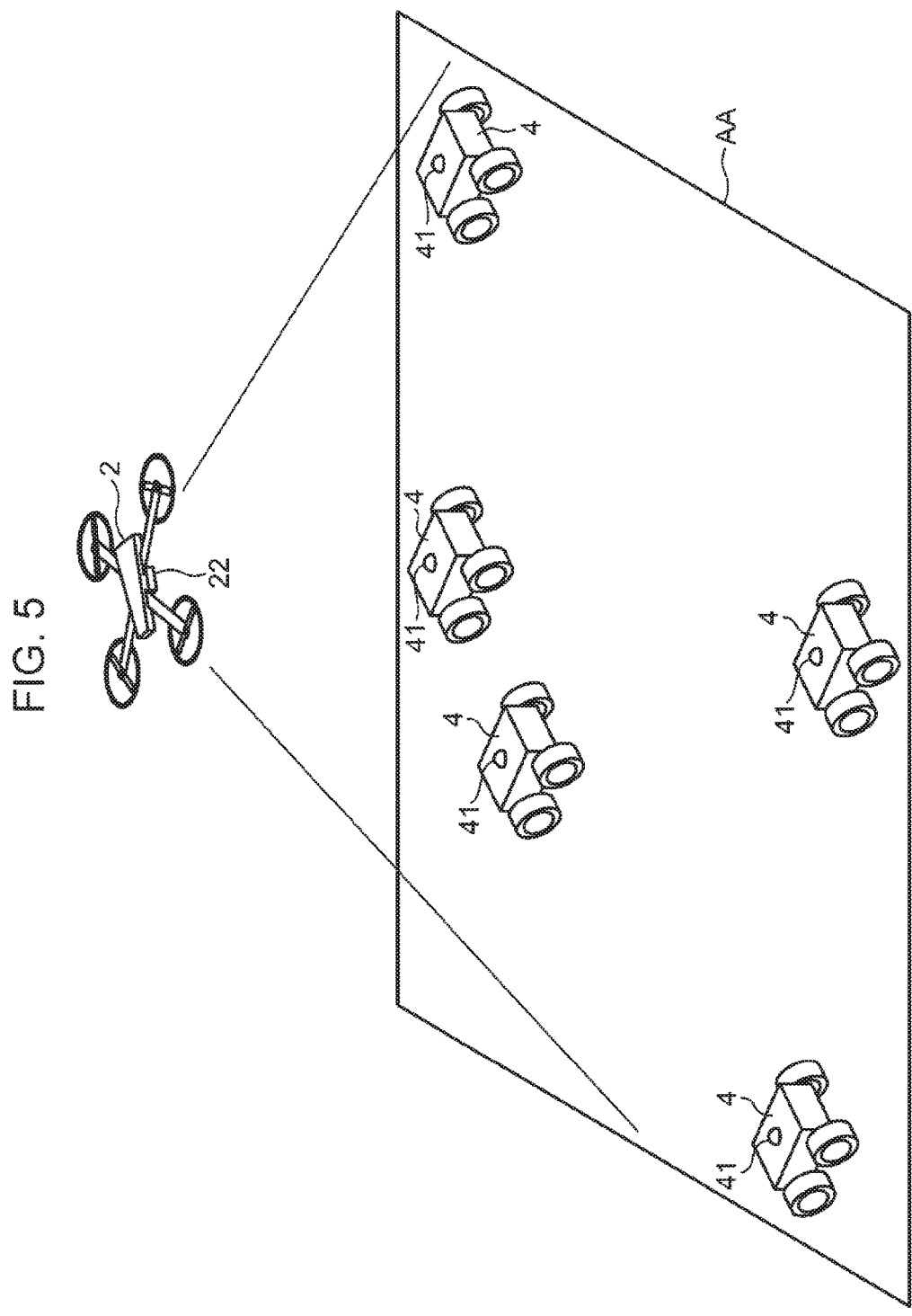
FIG. 5 is an image diagram depicting an example of a state in which the unmanned aerial vehicle depicted in FIG. 2 is capturing an image of a plurality of ground-based robots.

FIG. 5 is an image diagram depicting an example of a state in which the unmanned aerial vehicle 2 depicted in FIG. 2 is capturing an image of the plurality of ground-based robots. The example depicted in FIG. 5 is an example in which the unmanned aerial vehicle 2 is flying in the sky, and there are five ground-based robots 4 positioned below the position where the unmanned aerial vehicle 2 is flying. Each of the robots 4 is provided with a lamp 41, for example, and the lamp 41 is made to light up with a predetermined light emission color. At such time, the unmanned aerial vehicle 2 constantly captures images of below the position where the unmanned aerial vehicle 2 is flying, by means of the camera 22, the server device 1 recognizes the lamps 41 of the five ground-based robots 4 as markers from a captured image, and controls the flight altitude of the unmanned aerial vehicle 2 in such a way that all of the lamps 41 of the five ground-based robots 4 are within a region of interest AA, which is a region that can be captured by the camera 22 of the unmanned aerial vehicle 2.

Figure 6:
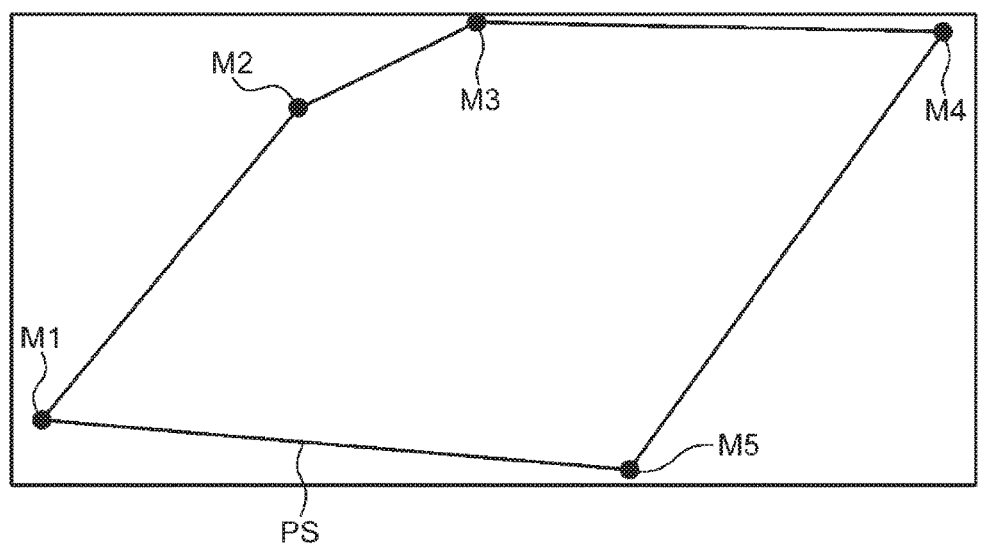
FIG. 6 is a diagram depicting an example of a polygon when the ground-based robots depicted in FIG. 5 serve as markers.

FIG. 6 is a diagram depicting an example of a polygon when the ground-based robots 4 depicted in FIG. 5 serve as markers. As depicted in FIG. 6, the server device 1 recognizes the lamps 41 of the five ground-based robots 4 as markers M1 to M5, and calculates the area of a polygon PS formed from the five markers M1 to M5.

Here, in the present embodiment, if the flight altitude of the unmanned aerial vehicle 2 is low, it is assumed that the number of markers captured by the camera 22 does not reach the preset number of markers (registered marker number). In other words, a polygon in which the number of markers serves as vertices is not drawn.

Therefore, the server device 1, as an initial state, increases the flight altitude of the unmanned aerial vehicle 2 until the number of markers reaches the registered marker number. Thereby, a polygon in which the number of markers serves as the number of vertices is obtained. In the process of the unmanned aerial vehicle 2 monotonously increasing the flight altitude, the camera 22 starts capturing images of the ground-based robots serving as markers (hereinafter, also referred to as "markers"). When the camera 22 captures the markers, the marker recognition unit 12 recognizes the ground-based robots 4 as markers, and starts counting the number of markers. Thereafter, the unmanned aerial vehicle 2 rises until the number of markers reaches the preset registered marker number.

When the unmanned aerial vehicle 2 continues to rise and the number of markers matches the registered marker number, a polygon in which the markers serve as vertices can be recognized, and therefore the area calculation unit 13 calculates the area of the polygon formed by the markers.

Thereafter, the area of the polygon is related to the flight altitude of the unmanned aerial vehicle 2, and, when the flight altitude of the unmanned aerial vehicle 2 is increased, the area of the polygon decreases. On the other hand, when the flight altitude of the unmanned aerial vehicle 2 is decreased, the area of the polygon increases, and eventually the markers fall outside of the angle of view of the camera 22, and therefore a state is entered where it is not possible to detect a polygon in which markers of the preset registered marker number serve as vertices.

At such time, the flight altitude control unit 15 changes the flight altitude of the unmanned aerial vehicle 2, and, based on the comparison result of the maximum-value detection unit 14, determines the flight altitude of the unmanned aerial vehicle 2 in such a way that the area of the polygon captured by the camera 22 is maximized. Furthermore, the ground-based robots 4 that constitute markers are constantly moving, and therefore the area of the polygon changes from moment to moment. The maximum-value detection unit 14 sequentially compares this changing area of the polygon, and the flight altitude control unit 15 controls the flight altitude of the unmanned aerial vehicle 2 in such a way that the area of the polygon drawn by the markers is maximized.

Figure 7:
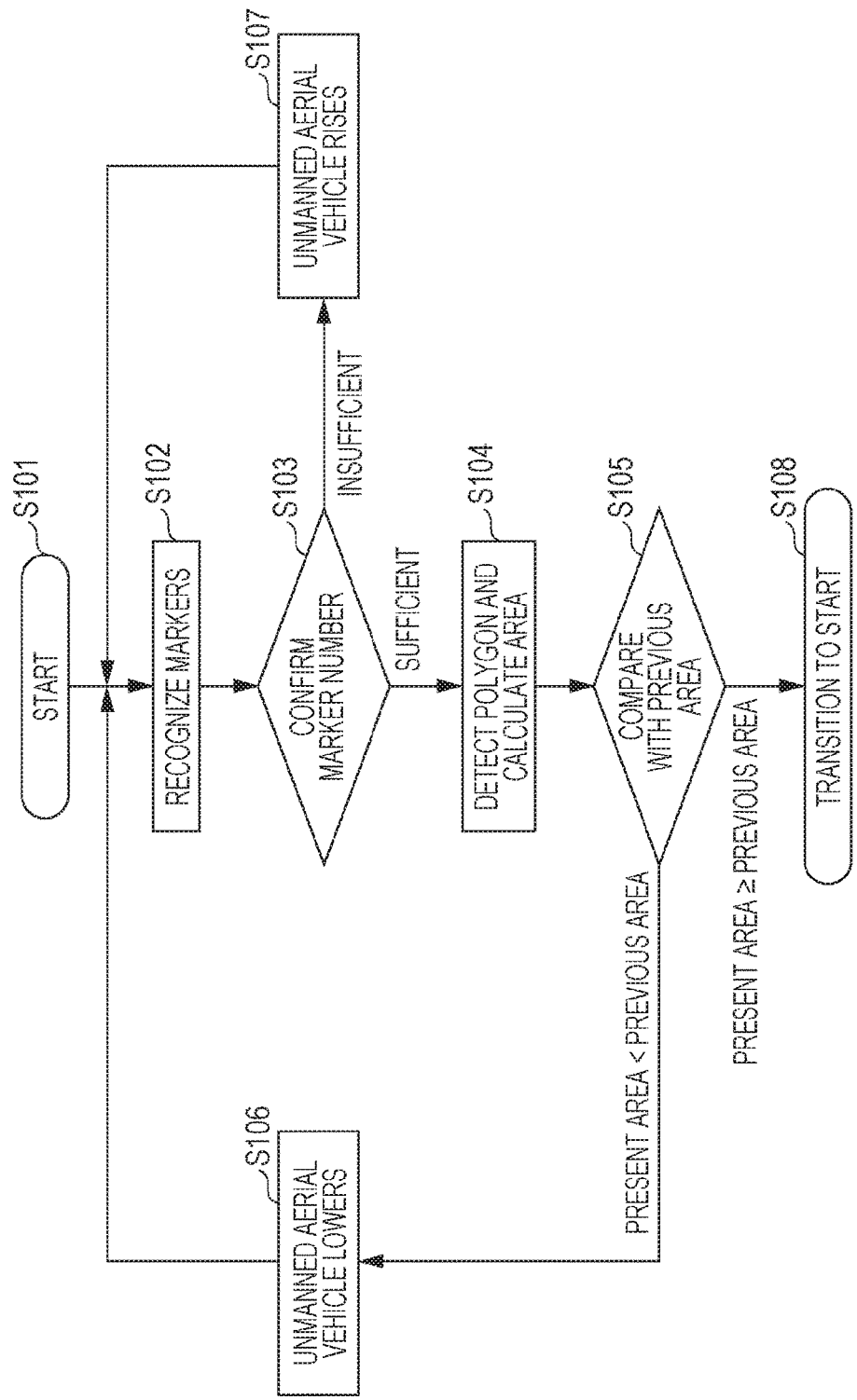
FIG. 7 is a flowchart depicting an example of flight altitude control processing performed by the server device depicted in FIG. 2.

Next, flight altitude control processing performed by the server device 1 depicted in FIG. 2 will be described using the flowchart of FIG. 7. FIG. 7 is a flowchart depicting an example of flight altitude control processing performed by the server device 1 depicted in FIG. 2.

In FIG. 7, first, the server device 1 starts flight altitude control processing (step S101). Next, in step S102, the marker recognition unit 12 acquires an image captured by the camera 22 and recognizes the markers.

Next, in step S103, the marker recognition unit 12 compares the number of recognized markers and the registered marker number stored in advance in the marker number storage unit 16. When the number of recognized markers is less than the registered marker number (insufficient number), a transition is made to step S107, and the marker recognition unit 12 notifies the flight altitude control unit 15 that the number of recognized markers is less than the registered marker number, and instructs the flight altitude of the unmanned aerial vehicle 2 to be increased. The flight altitude control unit 15 controls the flight altitude of the unmanned aerial vehicle 2 in accordance with the instruction.

On the other hand, when the number of recognized markers is the registered marker number (the number is met), a transition is made to step S104 in which the area of the polygon formed by the markers is calculated. In step S104, the area calculation unit 13 detects the positions of the markers using the image captured by the camera 22, and obtains the area of the polygon in which the detected markers serve as vertices.

Next, in step S105, the maximum-value detection unit 14, which stores the previous area of the polygon, compares the previous area of the polygon and the present area of the polygon calculated in step S104. When the present area of the polygon is smaller than the previous area of the polygon, a transition is made to step S106, and the maximum-value detection unit 14 notifies the flight altitude control unit 15 that the present area of the polygon is smaller than the previous area of the polygon, and instructs the flight altitude control unit 15 to decrease the altitude of the unmanned aerial vehicle. The flight altitude control unit 15 controls the flight altitude of the unmanned aerial vehicle 2 in accordance with the instruction.

On the other hand, when the present area of the polygon is equal to or larger than the previous area of the polygon, the maximum-value detection unit 14 notifies the flight altitude control unit 15 that the present area of the polygon is equal to or larger than the previous area of the polygon, and the flight altitude control unit 15, while maintaining that flight altitude, transitions to step S101 (step S108) and repeats the processing thereafter.

It should be noted that, as an initial state, the unmanned aerial vehicle 2 may be raised to an altitude at which all of the markers are captured in advance, in accordance with a manual operation performed by the operator of the unmanned aerial vehicle 2, and then the processing depicted in FIG. 7 may be carried out. Furthermore, the maximum-value detection unit 14 sets the initial value of the previous area of the polygon to "0". The same is also true for other embodiments.

According to the aforementioned processing, the server device 1 recognizes, as markers, the ground-based robots 4 captured using the camera 22 mounted on the unmanned aerial vehicle 2, and flies the unmanned aerial vehicle 2 at an altitude that enables capturing of an image in which a polygon having the markers as vertices is formed and the area of the polygon is maximized. Thereby, the flight altitude of the unmanned aerial vehicle 2 reaches the optimum altitude for capturing the region of interest as an image using the mounted camera 22, and can appropriately capture the region of interest designated by the markers on the ground.

In the present embodiment, ground-based robots are used as markers; however, it should be noted that any objects may be used as markers provided that the objects can be recognized as markers by the marker recognition unit 12 even if the objects are not robots. The same is also true for other embodiments.

Embodiment 2

A flight altitude control system according to embodiment 2 of the present disclosure controls the flight altitude of an unmanned aerial vehicle having an imaging device equipped with a zoom lens mounted thereon, and also controls the zoom ratio of the imaging device.

Figure 8:
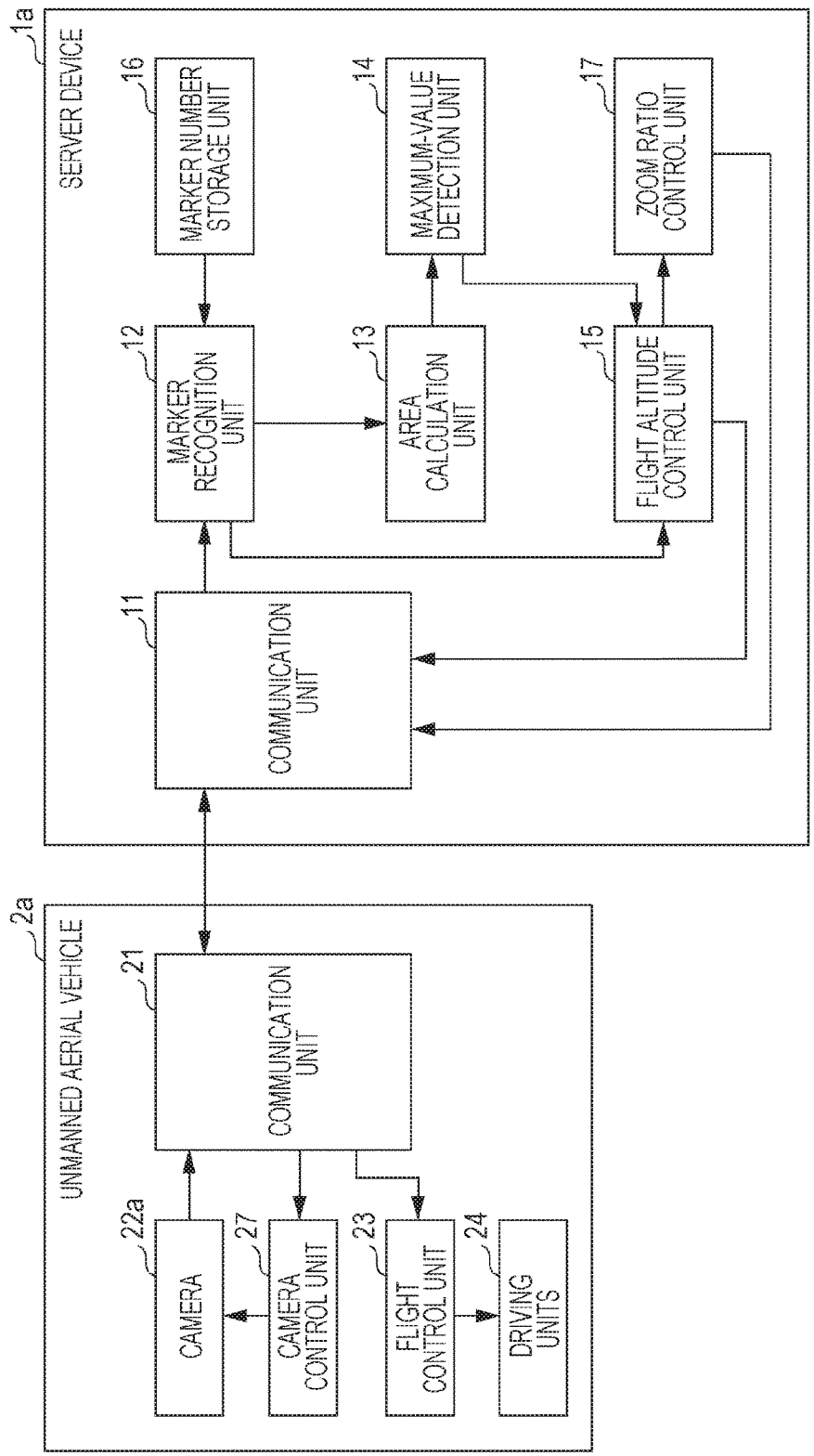
FIG. 8 is a block diagram depicting an example of a configuration of a flight altitude control system in embodiment 2 of the present disclosure.

FIG. 8 is a block diagram depicting an example of a configuration of the flight altitude control system in embodiment 2 of the present disclosure. It should be noted that, in FIG. 8, constituent elements that are the same as those in FIG. 2 are denoted by the same reference numerals, and detailed descriptions thereof are omitted.

In FIG. 8, the flight altitude control system of the present embodiment is provided with a server device 1a and an unmanned aerial vehicle 2a. The server device 1a is provided with a communication unit 11, a marker recognition unit 12, an area calculation unit 13, a maximum-value detection unit 14, a flight altitude control unit 15, a marker number storage unit 16, and a zoom ratio control unit 17. The unmanned aerial vehicle 2a is provided with a communication unit 21, a camera 22a, a flight control unit 23, driving units 24, and a camera control unit 27.

The communication unit 21 of the unmanned aerial vehicle 2a, via a network NW (not depicted), communicates with the communication unit 11 of the server device 1a, transmits an image or the like captured by the camera 22a to the communication unit 11, and receives various control commands or the like generated by the server device 1a from the communication unit 11.

The camera 22a is mounted on the unmanned aerial vehicle 2a, and captures images of objects, for example, ground-based robots, that serve as markers deployed below the unmanned aerial vehicle 2a. Here, as the camera 22a, an example is given in which a camera having a zoom lens mounted thereon (a zoom lens camera) is used. The camera 22a transmits a captured image (image data) to the communication unit 11 via the communication unit 21.

The unmanned aerial vehicle 2a has the same external appearance as the unmanned aerial vehicle 2 depicted in FIG. 3, and the camera 22a is attached to the bottom section of a main body 25 (not depicted). The driving units 24 are attached to the tip ends of support units 26 (not depicted) that extend in four directions from the main body 25. The communication unit 21, the flight control unit 23, and the camera control unit 27 depicted in FIG. 8 are housed inside the main body 25.

The flight control unit 23 controls the flight state including the flight altitude of the unmanned aerial vehicle 2a. The driving units 24 are made up of a propeller and a motor that rotates the propeller. The flight control unit 23 controls the movement direction, the flight altitude, and the like of the unmanned aerial vehicle 2a by appropriately controlling the rotational speed of the propellers of the driving units 24. The camera control unit 27 controls a zoom operation of the camera 22a.

The marker recognition unit 12 of the server device 1a acquires an image captured by the camera 22a via the communication unit 21, and recognizes, as markers, ground-based robots captured by the camera 22.

The marker number storage unit 16 stores a preset number of markers as a registered marker number. For example, the marker number storage unit 16 retains the data (registered marker number) depicted in FIG. 4, and the number of ground-based robots deployed on the ground is registered in advance in the marker number storage unit 16.

The marker recognition unit 12 compares the number of the plurality of recognized markers and the registered marker number stored in the marker number storage unit 16, outputs the comparison result to the flight altitude control unit 15, and also outputs the image captured by the camera 22a and the comparison result to the area calculation unit 13.

When the number of markers recognized by the marker recognition unit 12 matches the registered marker number registered in advance in the marker number storage unit 16, the area calculation unit 13 detects the positions of the markers using the image captured by the camera 22a, calculates the area of a polygon formed by the number of markers that matches the registered marker number, and outputs the calculated area of the polygon to the maximum-value detection unit 14.

The maximum-value detection unit 14 detects whether or not the area of the polygon is the maximum, while the flight altitude of the unmanned aerial vehicle 2a is controlled by the flight altitude control unit 15. Specifically, the maximum-value detection unit 14 has a function to store the area of the polygon calculated by the area calculation unit 13, performs processing that compares the previous area of the polygon and the most up-to-date area of the polygon to detect the maximum value, and outputs the comparison result to the flight altitude control unit 15.

The flight altitude control unit 15 controls the flight altitude of the unmanned aerial vehicle 2a on which the camera 22a is mounted, in such a way that the area of the polygon is maximized, on the basis of the comparison result of the marker recognition unit 12 and the comparison result of the maximum-value detection unit 14. Specifically, when the number of the plurality of markers recognized by the marker recognition unit 12 is less than the registered marker number, the flight altitude control unit 15 creates a control command for controlling the flight altitude of the unmanned aerial vehicle 2a in such a way that the flight altitude of the unmanned aerial vehicle 2a is increased, and transmits the created control command to the unmanned aerial vehicle 2a via the communication unit 11. Furthermore, when the number of the plurality of markers matches the registered marker number, and the area of the polygon is less than the area of the polygon previously calculated, the flight altitude control unit 15 creates a control command for controlling the flight altitude of the unmanned aerial vehicle 2a in such a way that the flight altitude of the unmanned aerial vehicle 2a is decreased, and transmits the created control command to the unmanned aerial vehicle 2a via the communication unit 11. In addition, when the number of the plurality of markers matches the registered marker number, and the area of the polygon is equal to or greater than the area of the polygon previously calculated, the flight altitude control unit 15 creates a control command for controlling the flight altitude of the unmanned aerial vehicle 2a in such a way that the flight altitude of the unmanned aerial vehicle 2a is maintained, and transmits the created control command to the unmanned aerial vehicle 2a via the communication unit 11.

The zoom ratio control unit 17 controls the zoom ratio of the camera 22a mounted on the unmanned aerial vehicle 2a. Specifically, the marker recognition unit 12 recognizes the plurality of ground-based robots as a plurality of markers, from the image captured by the camera 22a while the flight altitude of the unmanned aerial vehicle 2a is maintained at the present flight altitude. The area calculation unit 13 calculates, as an altitude-maintained area, the area of a polygon formed by the plurality of markers recognized while the flight altitude of the unmanned aerial vehicle 2a is maintained at the present flight altitude. The zoom ratio control unit 17 creates a control command for controlling the zoom ratio of the camera 22a in such a way that the altitude-maintained area is maximized, and transmits the created control command to the unmanned aerial vehicle 2a via the communication unit 11.

Furthermore, when the number of the plurality of markers recognized while the flight altitude of the unmanned aerial vehicle 2a is maintained at the present flight altitude is less than the registered marker number, the zoom ratio control unit 17 creates a control command for controlling the camera 22a in such a way that the camera 22a zooms out, and transmits the created control command to the unmanned aerial vehicle 2a via the communication unit 11. Here, when the camera 22a cannot zoom out, the zoom ratio control unit 17 creates a control command for maintaining the present zoom ratio of the camera 22a, and also the flight altitude control unit 15 creates a control command for increasing the flight altitude of the unmanned aerial vehicle 2a, and each of the created control commands is transmitted to the unmanned aerial vehicle 2a via the communication unit 11.

Furthermore, when the number of the plurality of markers recognized while the flight altitude of the unmanned aerial vehicle 2a is maintained at the present flight altitude matches the registered marker number, and the altitude-maintained area is smaller than the altitude-maintained area previously calculated, the zoom ratio control unit 17 creates a control command for controlling the camera 22a in such a way that the camera 22a zooms in, and transmits the created control command to the unmanned aerial vehicle 2a via the communication unit 11. Here, when the camera 22a cannot zoom in, the zoom ratio control unit 17 creates a control command for maintaining the present zoom ratio of the camera 22a, and also the flight altitude control unit 15 creates a control command for decreasing the flight altitude of the unmanned aerial vehicle 2a, and each of the created control commands is transmitted to the unmanned aerial vehicle 2a via the communication unit 11.

It should be noted that the configuration of the zoom ratio control unit 17 is not particularly restricted to the aforementioned example, and various alterations are possible; for example, the zoom ratio control unit 17 may be omitted, and the flight altitude control unit 15 may execute the function of the zoom ratio control unit 17.

According to the above configuration, the unmanned aerial vehicle 2a constantly captures images of below the position where the unmanned aerial vehicle 2a is flying, by means of the camera 22a. The region captured by the camera 22a of the unmanned aerial vehicle 2a changes depending on the flight altitude of the unmanned aerial vehicle 2a and the zoom ratio of the zoom lens mounted in the camera 22a. That is, the region being captured widens as the unmanned aerial vehicle 2a causes the zoom lens to zoom out from the tele (telephoto) side toward the wide (wide angle) side. Furthermore, the region being captured narrows as the unmanned aerial vehicle 2a causes the zoom lens to zoom in from the wide (wide angle) side toward the tele (telephoto) side.

In the present embodiment, as an initial state, the zoom ratio of the camera 22a is set to the maximum value on the wide side (the wide end), in other words, to a state in which the greatest number of objects can be captured at the maximum angle of view. A plurality of ground-based robots that serve as markers are deployed below the unmanned aerial vehicle 2a, and, due to the camera 22a capturing an image thereof, a polygon is generated in which the positions of the ground-based robots serve as vertices. This situation is the same as the situation described in FIG. 5 and FIG. 6.

Here, in the present embodiment, if the flight altitude of the unmanned aerial vehicle 2a is low, it is assumed that the number of markers captured by the camera 22a does not reach the preset number of markers (registered marker number).

Therefore, the server device 1a, as an initial state, increases the flight altitude of the unmanned aerial vehicle 2a until the number of markers reaches the registered marker number. In the process of the unmanned aerial vehicle 2a monotonously increasing the flight altitude, the camera 22a starts capturing images of the ground-based robots serving as markers (hereinafter, also referred to as "markers"). When the camera 22a captures the markers, the marker recognition unit 12 recognizes the ground-based robots as markers, and starts counting the number of markers. Thereafter, the unmanned aerial vehicle 2a rises until the number of markers reaches the preset registered marker number.

When the unmanned aerial vehicle 2a continues to rise and the number of markers matches the registered marker number, a polygon in which the markers serve as vertices can be recognized, and therefore the area calculation unit 13 calculates the area of the polygon formed with the markers serving as vertices.

Thereafter, the area of the polygon is related to the flight altitude of the unmanned aerial vehicle 2a, and, when the flight altitude of the unmanned aerial vehicle 2a is increased, the area of the polygon decreases. On the other hand, when the flight altitude of the unmanned aerial vehicle 2a is decreased, the area of the polygon increases, and eventually the markers fall outside of the angle of view of the camera 22a, and therefore a state is entered where it is not possible to detect a polygon in which markers of the preset registered marker number serve as vertices.

Furthermore, the area of the polygon is related to the zoom ratio of the zoom lens of the camera 22a, and, when the camera 22a zooms out (moves from the tele side to the wide side), the area of the polygon decreases. On the other hand, when the camera 22a zooms in (moves from the wide side to the tele side), the area of the polygon increases, and there is a possibility of a state eventually being entered where it is not possible to detect a polygon in which markers of the preset registered marker number serve as vertices. Although, when the unmanned aerial vehicle 2a is flying at a sufficiently high altitude, it is possible for a polygon to be drawn even when the zoom ratio of the camera 22a is changed to the tele end (a state in which zooming has been performed up to the maximum at the tele side).

At such time, the flight altitude control unit 15 changes the flight altitude of the unmanned aerial vehicle 2a, and, based on the comparison result of the maximum-value detection unit 14, determines the flight altitude of the unmanned aerial vehicle 2 in such a way that the area of the polygon captured by the camera 22a is maximized.

In this case also, the ground-based robots that constitute markers are constantly moving, and therefore the area of the polygon changes from moment to moment. The maximum-value detection unit 14 sequentially calculates this changing area of the polygon as the altitude-maintained area, and the zoom ratio control unit 17 controls the zoom ratio of the camera 22a in such a way that the area of the polygon drawn by the markers (the altitude-maintained area) is maximized.

Figure 9:
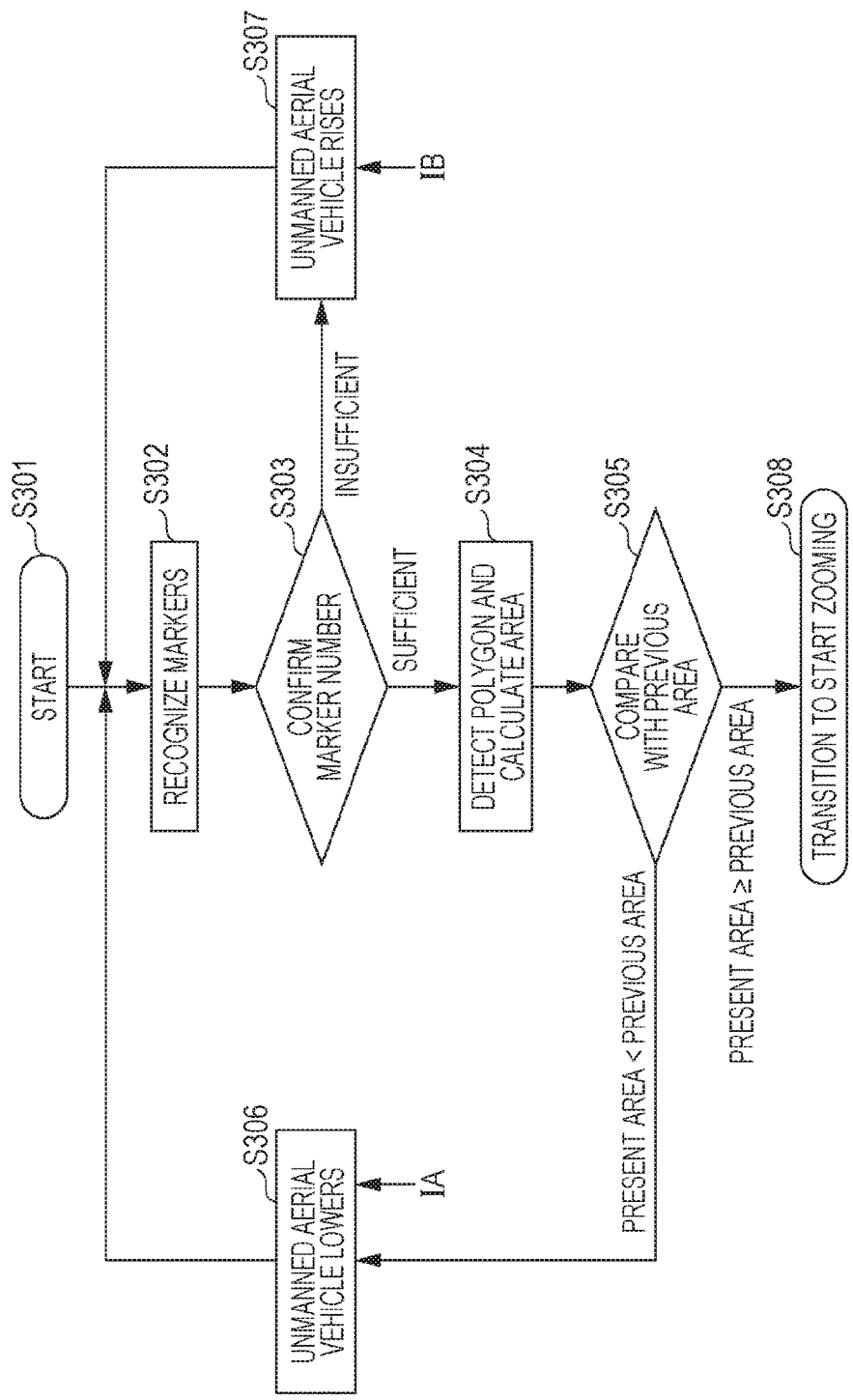
FIG. 9 is a first flowchart depicting an example of flight altitude control processing performed by the server device depicted in FIG. 8.
Figure 10:
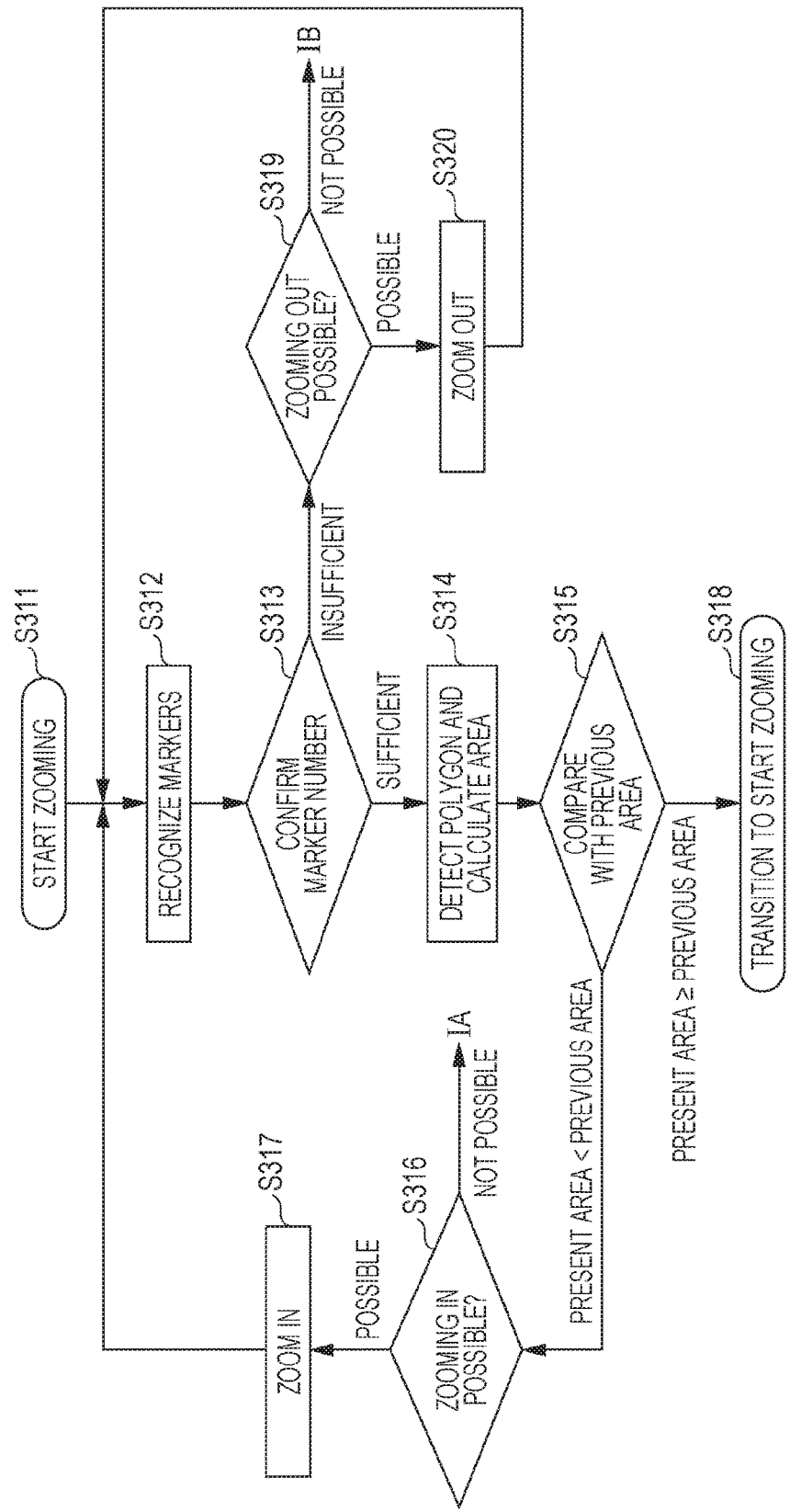
FIG. 10 is a second flowchart depicting an example of flight altitude control processing performed by the server device depicted in FIG. 8.

Next, flight altitude control processing performed by the server device 1a depicted in FIG. 8 will be described using the flowcharts of FIG. 9 and FIG. 10. FIG. 9 and FIG. 10 are first and second flowcharts depicting an example of flight altitude control processing performed by the server device 1a depicted in FIG. 8. Here, the unmanned aerial vehicle 2a is raised while the zoom ratio of the camera 22a is set to the wide side.

In FIG. 9, first, the server device 1a starts flight altitude control processing (step S301). Next, in step S302, the marker recognition unit 12 acquires an image captured by the camera 22a and recognizes markers.

Next, in step S303, the marker recognition unit 12 compares the number of recognized markers and the registered marker number stored in advance in the marker number storage unit 16. When the number of recognized markers is less than the registered marker number (insufficient number), a transition is made to step S307, and the marker recognition unit 12 notifies the flight altitude control unit 15 that the number of recognized markers is less than the registered marker number, and instructs the flight altitude control unit 15 to increase the altitude of the unmanned aerial vehicle. The flight altitude control unit 15 controls the flight altitude of the unmanned aerial vehicle 2a in accordance with the instruction.

On the other hand, when the number of recognized markers is the registered marker number (the number is met), a transition is made to step S304 in which the area of a polygon formed by the markers is calculated. In step S304, the area calculation unit 13 detects the positions of the markers using the image captured by the camera 22a, and obtains the area of the polygon in which the detected markers serve as vertices.

Next, in step S305, the maximum-value detection unit 14, which stores the area of the polygon previously calculated, compares the previous area of the polygon and the present area of the polygon calculated in step S304. When the present area of the polygon is smaller than the previous area of the polygon, a transition is made to step S306, and the maximum-value detection unit 14 notifies the flight altitude control unit 15 that the present area of the polygon is smaller than the previous area of the polygon, and instructs the flight altitude control unit 15 to decrease the altitude of the unmanned aerial vehicle. The flight altitude control unit 15 controls the flight altitude of the unmanned aerial vehicle 2a in accordance with the instruction.

On the other hand, when the present area of the polygon is equal to or larger than the previous area of the polygon, the maximum-value detection unit 14 notifies the flight altitude control unit 15 that the present area of the polygon is equal to or larger than the previous area of the polygon, and the flight altitude control unit 15, while maintaining that flight altitude, transitions to step S311 depicted in FIG. 10 (step S308).

Next, in FIG. 10, the server device 1a starts adjustment processing according to the zoom ratio (step S311). Next, in step S312, the marker recognition unit 12 acquires the image captured by the camera 22a and recognizes markers.

Next, in step S313, the marker recognition unit 12 compares the number of recognized markers and the registered marker number stored in advance in the marker number storage unit 16. When the number of recognized markers is less than the registered marker number (insufficient number), a transition is made to step S319, and the marker recognition unit 12 notifies the flight altitude control unit 15 that the number of recognized markers is less than the registered marker number, and the flight altitude control unit 15 determines whether or not the camera 22a can zoom out.

For example, the flight altitude control unit 15 issues a query to the zoom ratio control unit 17 regarding whether or not zooming out is possible, and determines whether or not zooming out is possible, on the basis of the response from the zoom ratio control unit 17. It should be noted that the determination regarding whether or not zooming out is possible is not particularly restricted to the aforementioned example, and various alterations are possible; for example, the flight altitude control unit 15 may determine whether or not zooming out is possible, by comparing the present zoom ratio and the maximum value toward the wide side (the wide end) of the mounted camera 22a, and the determination may be made by the zoom ratio control unit 17. The same is also true for other embodiments.

When it is determined that zooming out is possible, the flight altitude control unit 15 instructs the zoom ratio control unit 17 to zoom out. Next, in step S320, the zoom ratio control unit 17 instructs the camera control unit 27 to cause the lens of the camera 22a to zoom out, and the camera control unit 27 causes the lens of the camera 22a to zoom out. Thereafter, a transition is made to step S312, and the processing thereafter is continued.

On the other hand, in step S319, when the flight altitude control unit 15 has determined that zooming out is not possible, a transition is made to step S307 depicted in FIG. 9, and a switch is made to processing to alter the flight altitude of the unmanned aerial vehicle 2a by means of the flight altitude control unit 15.

Furthermore, in S313, when the number of recognized markers is the registered marker number (the number is met), a transition is made to step S314 in which the area of the polygon formed by the markers is calculated. In step S314, the area calculation unit 13 detects the positions of the markers using the camera image captured by the camera 22a, and obtains, as the altitude-maintained area, the area of the polygon in which the detected markers serve as vertices.

Next, in step S315, the maximum-value detection unit 14, which stores the area of the polygon previously calculated, compares the previous area of the polygon (the altitude-maintained area previously calculated) and the present area of the polygon (the altitude-maintained area) calculated in step S314. When the present area of the polygon is smaller than the previous area of the polygon, a transition is made to step S316, and the maximum-value detection unit 14 notifies the flight altitude control unit 15 that the present area of the polygon is smaller than the previous area of the polygon, and the flight altitude control unit 15 determines whether or not the camera 22a can zoom in.

For example, the flight altitude control unit 15 issues a query to the zoom ratio control unit 17 regarding whether or not zooming in is possible, and determines whether or not zooming in is possible, on the basis of the response from the zoom ratio control unit 17. It should be noted that the determination regarding whether or not zooming in is possible is not particularly restricted to the aforementioned example, and various alterations are possible; for example, the flight altitude control unit 15 may determine whether or not zooming in is possible, by comparing the present zoom ratio and the smallest value toward the tele side (the tele end) of the mounted camera 22a, and the determination may be made by the zoom ratio control unit 17. The same is also true for other embodiments.

When it is determined that zooming in is possible, the flight altitude control unit 15 instructs the zoom ratio control unit 17 to zoom in. Next, in step S317, the zoom ratio control unit 17 instructs the camera control unit 27 to cause the lens of the camera 22a to zoom in, and the camera control unit 27 causes the lens of the camera 22a to zoom in. Thereafter, a transition is made to step S312, and the processing thereafter is continued.

On the other hand, in step S316, when the flight altitude control unit 15 has determined that zooming in is not possible, a transition is made to step S306 depicted in FIG. 9, and a switch is made to processing to alter the flight altitude of the unmanned aerial vehicle 2a by means of the flight altitude control unit 15.

Furthermore, when the present area of the polygon is equal to or larger than the previous area of the polygon, the maximum-value detection unit 14 notifies the flight altitude control unit 15 that the present area of the polygon is equal to or larger than the previous area of the polygon, and the flight altitude control unit 15, while maintaining the flight altitude of the unmanned aerial vehicle 2a, instructs the zoom ratio control unit 17 to maintain the present zoom ratio of the camera 22a, and a transition is made to step S311, and the processing thereafter is repeated (step S318).

According to the aforementioned processing, the server device 1a recognizes, as markers, the ground-based robots captured using the camera 22a mounted on the unmanned aerial vehicle 2a, and flies the unmanned aerial vehicle 2a at an altitude that enables capturing of an image in which a polygon having the markers as vertices is formed and the area of the polygon is maximized. Thereby, the flight altitude of the unmanned aerial vehicle 2a reaches the optimum altitude for capturing the region of interest as an image using the mounted camera 22a, and can appropriately capture the region of interest designated by the markers on the ground.

Furthermore, there are also cases where, due to an obstacle on the ground (a structure, a tree, or the like), the unmanned aerial vehicle 2a is unable to maintain the optimum altitude decided in the aforementioned processing. In these kinds of cases also, in the present embodiment, the server device 1a can increase the flight altitude of the unmanned aerial vehicle 2a, and, after the obstacle has been avoided, move the zoom ratio of the lens of the camera 22a to the tele side, and it is therefore possible to obtain an appropriate image.

In the processing depicted in FIG. 9 and FIG. 10, the zoom ratio is altered after the flight altitude has been adjusted, and, at a timing when it has become not possible to implement an adjustment by altering the zoom ratio, a switch is made to processing to alter the flight altitude; however, it should be noted that the present disclosure is not restricted thereto. Various alterations are possible, and it is sufficient for the unmanned aerial vehicle 2a to be controlled, using both alterations of the flight altitude and alterations of the zoom ratio, in such a way that the area of the polygon captured by the camera 22a is maximized. The same is also true for other embodiments.

Embodiment 3

In a flight altitude control system according to embodiment 3 of the present disclosure, the number of markers to be recognized is not registered in the system in advance, but rather a user selects ground-based robots to be used as markers from among a plurality of ground-based robots, and, using the selected markers, the flight altitude of an unmanned aerial vehicle having an imaging device equipped with a zoom lens mounted thereon is controlled, and also the zoom ratio of the imaging device is controlled.

Figure 11:
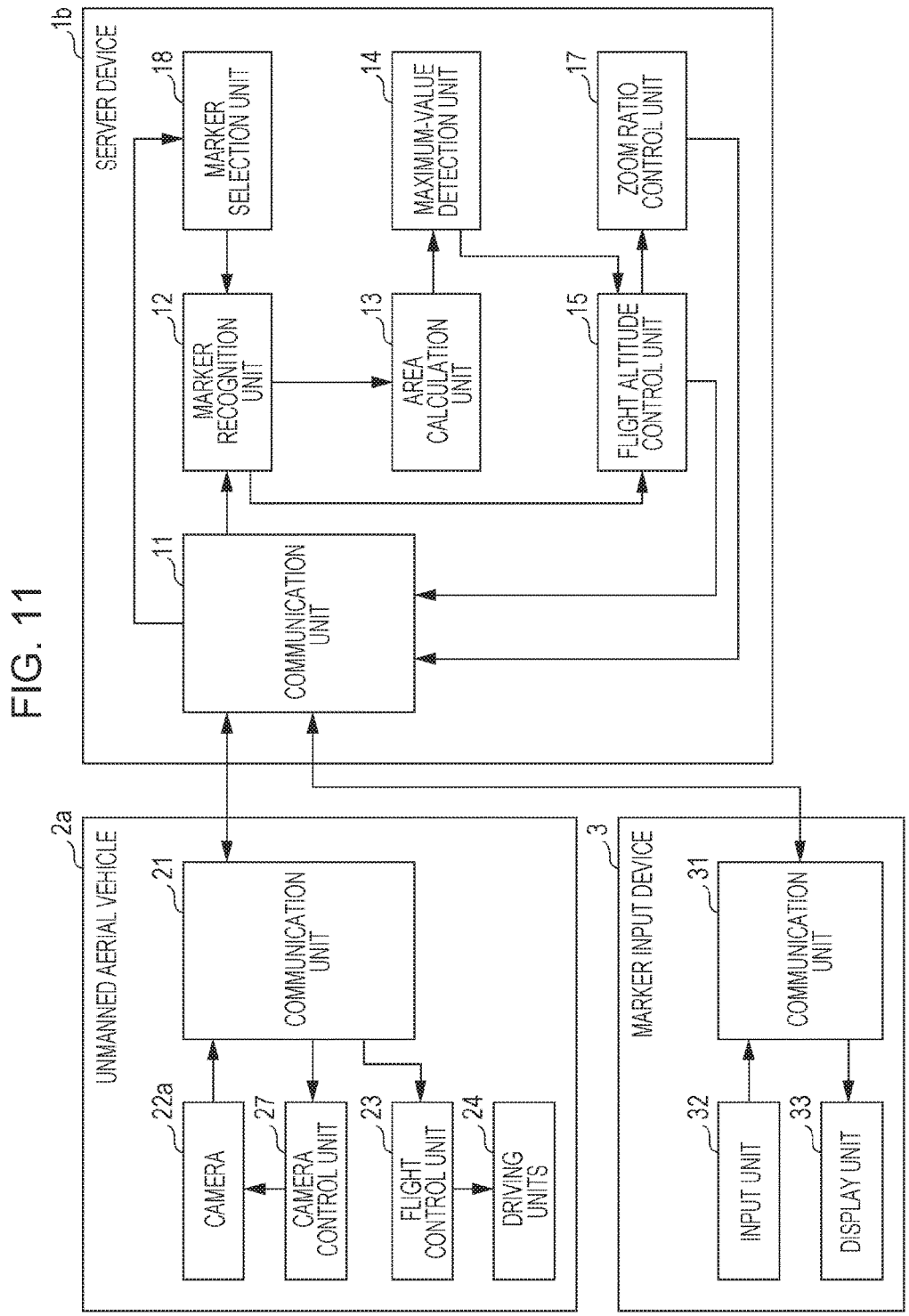
FIG. 11 is a block diagram depicting an example of a configuration of a flight altitude control system in embodiment 3 of the present disclosure.

FIG. 11 is a block diagram depicting an example of a configuration of the flight altitude control system in embodiment 3 of the present disclosure. It should be noted that, in FIG. 11, constituent elements that are the same as those in FIG. 8 are denoted by the same reference numerals, and detailed descriptions thereof are omitted.

In FIG. 11, the flight altitude control system of the present embodiment is provided with a server device 1b, an unmanned aerial vehicle 2a, and a marker input device 3. The server device 1b is provided with a communication unit 11, a marker recognition unit 12, an area calculation unit 13, a maximum-value detection unit 14, a flight altitude control unit 15, a zoom ratio control unit 17, and a marker selection unit 18. The unmanned aerial vehicle 2a is provided with a communication unit 21, a camera 22a, a flight control unit 23, driving units 24, and a camera control unit 27, and is configured in the same way as the unmanned aerial vehicle 2a depicted in FIG. 8. The marker input device 3 is provided with a communication unit 31, an input unit 32, and a display unit 33.

In the present embodiment, the number of the ground-based robots deployed on the ground is not registered in the system in advance, and the server device 1b is provided with the marker selection unit 18 instead of the marker number storage unit 16 depicted in FIG. 8.

The communication unit 31 of the marker input device 3, via a network NW (not depicted), communicates with the communication unit 11 of the server device 1b, receives information from the communication unit 11, such as an image captured by the camera 22a received by the marker recognition unit 12 and the positions of markers recognized by the marker recognition unit 12, and outputs the information to the display unit 33. The display unit 33 displays an input screen in which a plurality of candidate markers that indicate the positions of the plurality of markers (the plurality of ground-based robots) recognized by the marker recognition unit 12 are superimposed on the image captured by the camera 22a. The input unit 32 acquires an operation input by the user, and is configured of a touch sensor formed on a screen (display screen) of the display unit 33, for example.

The user selects desired candidate markers using the input unit 32 from among the plurality of candidate markers displayed on the input screen of the display unit 33, and thereby selects, from among the plurality of ground-based robots, a plurality of ground-based robots that the user wishes to be captured by the camera 22a. At such time, the input unit 32 transmits the plurality of candidate markers selected by the user, to the communication unit 11 via the communication unit 31, as recognition-subject markers.

It should be noted that the configuration of the marker input device 3 is not particularly restricted to the aforementioned example, and a control device which is external to an unmanned aerial vehicle that is connected wirelessly or by means of optical communication or the like, for example, a PROPO controller, may also function as the marker input device 3.

Figures 12, 13:
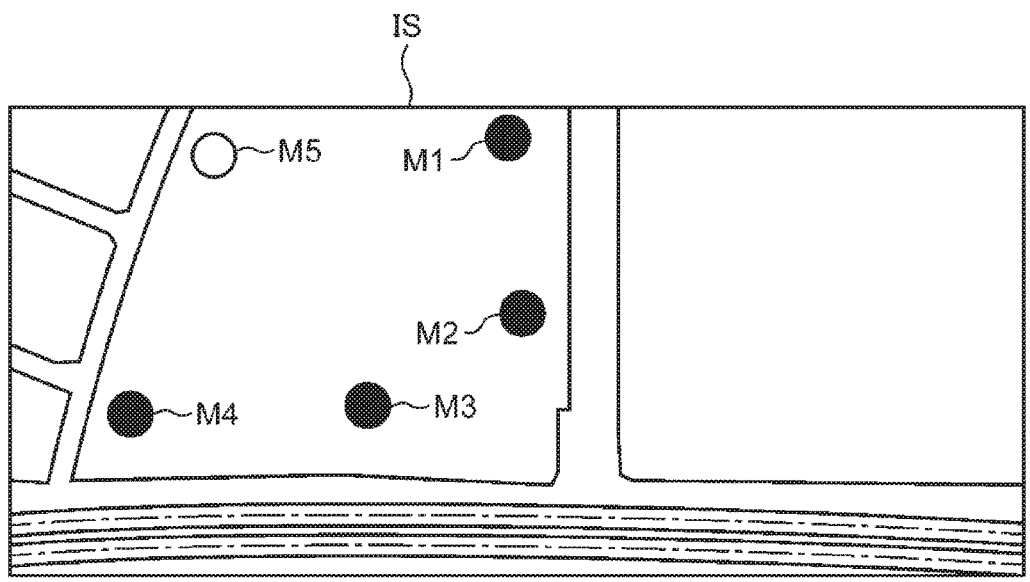
FIG. 12 is a diagram depicting an example of an input screen displayed on a display unit depicted in FIG. 11.
FIG. 13 is a diagram depicting an example of data retained by a marker selection unit depicted in FIG. 11.

FIG. 12 is a diagram depicting an example of the input screen displayed on the display unit 33 depicted in FIG. 11. As depicted in FIG. 12, in an input screen IS, for example, five candidate markers M1 to M5 that indicate the positions of five robots are displayed superimposed on a captured image. The user selects, from among the five candidate markers M1 to M5 displayed, the ground-based robots to be used as recognition-subject markers. In the example depicted in FIG. 12, the four candidate markers M1 to M4 selected by the user are displayed as black dots, and the candidate marker M5 not selected by the user is displayed as a white dot. In this way, an image captured by the camera 22a is displayed on a screen equipped with touch sensors, and by means of a simple operation such as ground-based robots of interest to the user being designated on the displayed screen as recognition-subject markers, it is possible for desired ground-based robots to be selected as recognition-subject markers.

Referring to FIG. 11 once again, the marker selection unit 18 of the server device 1b receives a plurality of recognition-subject markers transmitted from the marker input device 3 via the communication unit 11, and stores the information of three or more recognition-subject markers as registered marker information.

FIG. 13 is a diagram depicting an example of data retained by the marker selection unit 18 depicted in FIG. 11. As depicted in FIG. 13, the marker selection unit 18 stores, as registered markers, the plurality of recognition-subject markers selected by the user using the marker input device 3, and associates and stores a marker ID (identification information) of each of the recognition-subject markers and coordinates (X and Y) constituting position information, for example, latitude and longitude information.

Specifically, the marker recognition unit 12, when having recognized the markers, determines the marker ID and position information of each of the markers using map data stored in advance, and transmits the marker IDs and position information to the marker input device 3, the input unit 32 transmits the marker IDs and position information of the recognition-subject markers selected by the user to the marker selection unit 18, and the marker selection unit 18 stores the transmitted marker IDs and position information.

It should be noted that the method for acquiring position information is not particularly restricted to the aforementioned example; for example, a positioning system such as the Global Positioning System (GPS) or the Global Navigation Satellite System (GLONASS) may be used for the unmanned aerial vehicle 2a to acquire its own position and transmit the position to the server device 1b or the marker input device 3, with the position of each of the ground-based robots being determined based on the position of the unmanned aerial vehicle 2a, or for the ground-based robots to acquire their own positions and transmit the positions to the server device 1b or the marker input device 3. Furthermore, the data retained by the marker selection unit 18 is not particularly restricted to the aforementioned example, and in a similar manner to FIG. 4, the number of recognition-subject markers may be stored as the registered marker number.

Referring to FIG. 11 once again, the marker recognition unit 12 acquires an image captured by the camera 22a via the communication unit 21, and recognizes the ground-based robots that correspond with the recognition-subject markers stored in the marker selection unit 18, as markers, from among the ground-based robots captured by the camera 22a. The marker recognition unit 12 compares the number of the plurality of recognized markers and the number of recognition-subject markers stored in the marker selection unit 18, outputs the comparison result to the flight altitude control unit 15, and also outputs the image captured by the camera 22a and the comparison result to the area calculation unit 13. Here, the marker recognition unit 12 may not only compare the number of the plurality of recognized markers and the number of recognition-subject markers stored in the marker selection unit 18 but may also compare the position information of each of the markers.

When the number of markers recognized by the marker recognition unit 12 and the number of recognition-subject markers stored in the marker selection unit 18 match, the area calculation unit 13 uses the image captured by the camera 22a to calculate the area of the polygon formed by the recognition-subject markers stored in the marker selection unit 18, and outputs the calculated area of the polygon to the maximum-value detection unit 14.

The maximum-value detection unit 14, the flight altitude control unit 15, and the zoom ratio control unit 17 are configured in the same way and operate in the same way as the maximum-value detection unit 14, the flight altitude control unit 15, and the zoom ratio control unit 17 depicted in FIG. 8.

According to the above configuration, the unmanned aerial vehicle 2a constantly captures images of below the position where the unmanned aerial vehicle 2a is flying, by means of the camera 22a. The region captured by the camera 22a of the unmanned aerial vehicle 2a changes depending on the flight altitude of the unmanned aerial vehicle 2a and the zoom ratio of the zoom lens mounted in the camera 22a. That is, the region being captured widens as the unmanned aerial vehicle 2a causes the zoom lens to zoom out from the tele (telephoto) side toward the wide (wide angle) side. Furthermore, the region being captured narrows as the unmanned aerial vehicle 2a causes the zoom lens to zoom in from the wide (wide angle) side toward the tele (telephoto) side.

In the present embodiment also, as an initial state, the zoom ratio of the camera 22a is set to the maximum value on the wide side (the wide end), in other words, to a state in which the greatest number of objects can be captured at the maximum angle of view. A plurality of ground-based robots that serve as markers are deployed below the unmanned aerial vehicle 2a, and, due to the camera 22a capturing an image thereof, a polygon is generated in which the positions of the ground-based robots serve as vertices. This situation is the same as the situation described in FIG. 5 and FIG. 6.

Here, in the present embodiment, if the flight altitude of the unmanned aerial vehicle 2a is low, it is assumed that all of the recognition-subject markers (all of the registered markers) stored in the marker selection unit 18 are not captured in the image captured by the camera 22a, and that all of the registered markers cannot be recognized.

Therefore, the server device 1b, as an initial state, increases the flight altitude of the unmanned aerial vehicle until all of the registered markers are recognized. In the process of the unmanned aerial vehicle 2a monotonously increasing the flight altitude, the camera 22a starts capturing images of the ground-based robots serving as markers (hereinafter, also referred to as "markers"). When the camera 22a captures the markers, the marker recognition unit 12 recognizes the ground-based robots as markers.

At such time, the marker recognition unit 12 treats the recognized markers as candidate markers and transmits, to the marker input device 3, the image of the camera 22a with the candidate markers superimposed thereon, and the user uses the marker input device 3 to select candidate markers (ground-based robots) to be used, from among the plurality of candidate markers (ground-based robots) displayed superimposed on the captured image.

When the candidate markers are selected, the marker input device 3 transmits the selected candidate markers as recognition-subject markers to the server device 1b, and the area calculation unit 13 calculates the area of a polygon formed by the recognition-subject markers (registered markers).

Thereafter, the area of the polygon is related to the flight altitude of the unmanned aerial vehicle 2a, and, when the flight altitude of the unmanned aerial vehicle 2a is increased, the area of the polygon decreases. On the other hand, when the flight altitude of the unmanned aerial vehicle 2a is decreased, the area of the polygon increases, and eventually the markers fall outside of the angle of view of the camera 22a, and therefore a state is entered where it is not possible to detect a polygon in which the recognition-subject markers (registered markers) serve as vertices.

Furthermore, the area of the polygon is related to the zoom ratio of the zoom lens of the camera 22a, and, when the camera 22a zooms out (moves from the tele side to the wide side), the area of the polygon decreases. On the other hand, when the camera 22a zooms in (moves from the wide side to the tele side), the area of the polygon increases, and there is a possibility of a state eventually being entered where it is not possible to detect a polygon in which the recognition-subject markers (registered markers) serve as vertices.

At such time, the flight altitude control unit 15 changes the flight altitude of the unmanned aerial vehicle 2a, and, based on the comparison result of the maximum-value detection unit 14, determines the flight altitude of the unmanned aerial vehicle 2 in such a way that the area of the polygon captured by the camera 22a is maximized.

In this case also, the ground-based robots that constitute markers are constantly moving, and therefore the area of the polygon changes from moment to moment. The maximum-value detection unit 14 sequentially calculates this changing area of the polygon as the altitude-maintained area, and the zoom ratio control unit 17 controls the zoom ratio of the camera 22a in such a way that the area of the polygon drawn by the markers (the altitude-maintained area) is maximized. Furthermore, when the markers move continuously, the unmanned aerial vehicle 2a may be configured in such a way as to automatically track the recognition-subject markers (registered markers) stored in the marker selection unit 18.

Figure 14:
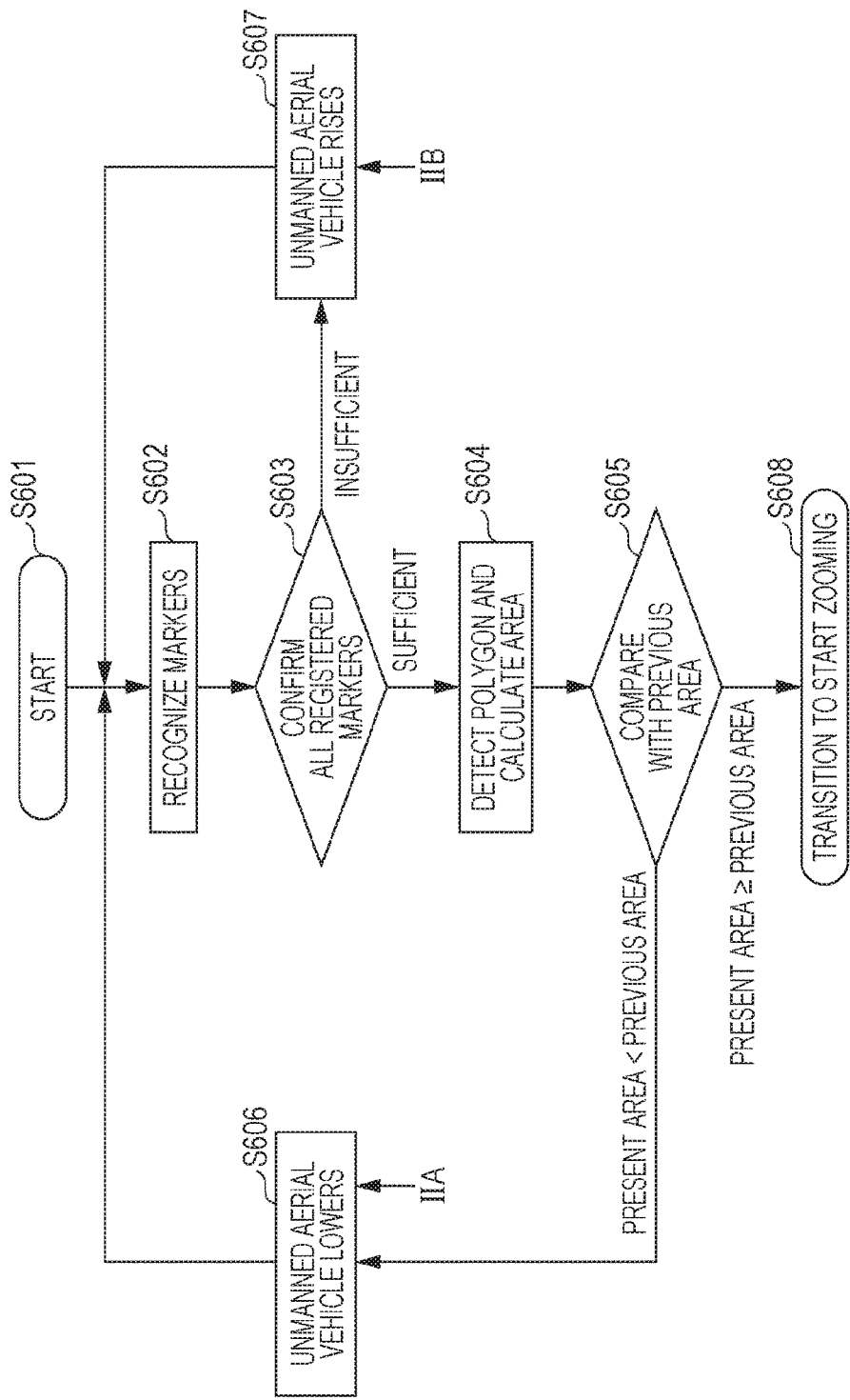
FIG. 14 is a first flowchart depicting an example of flight altitude control processing performed by the server device depicted in FIG. 11.
Figure 15:
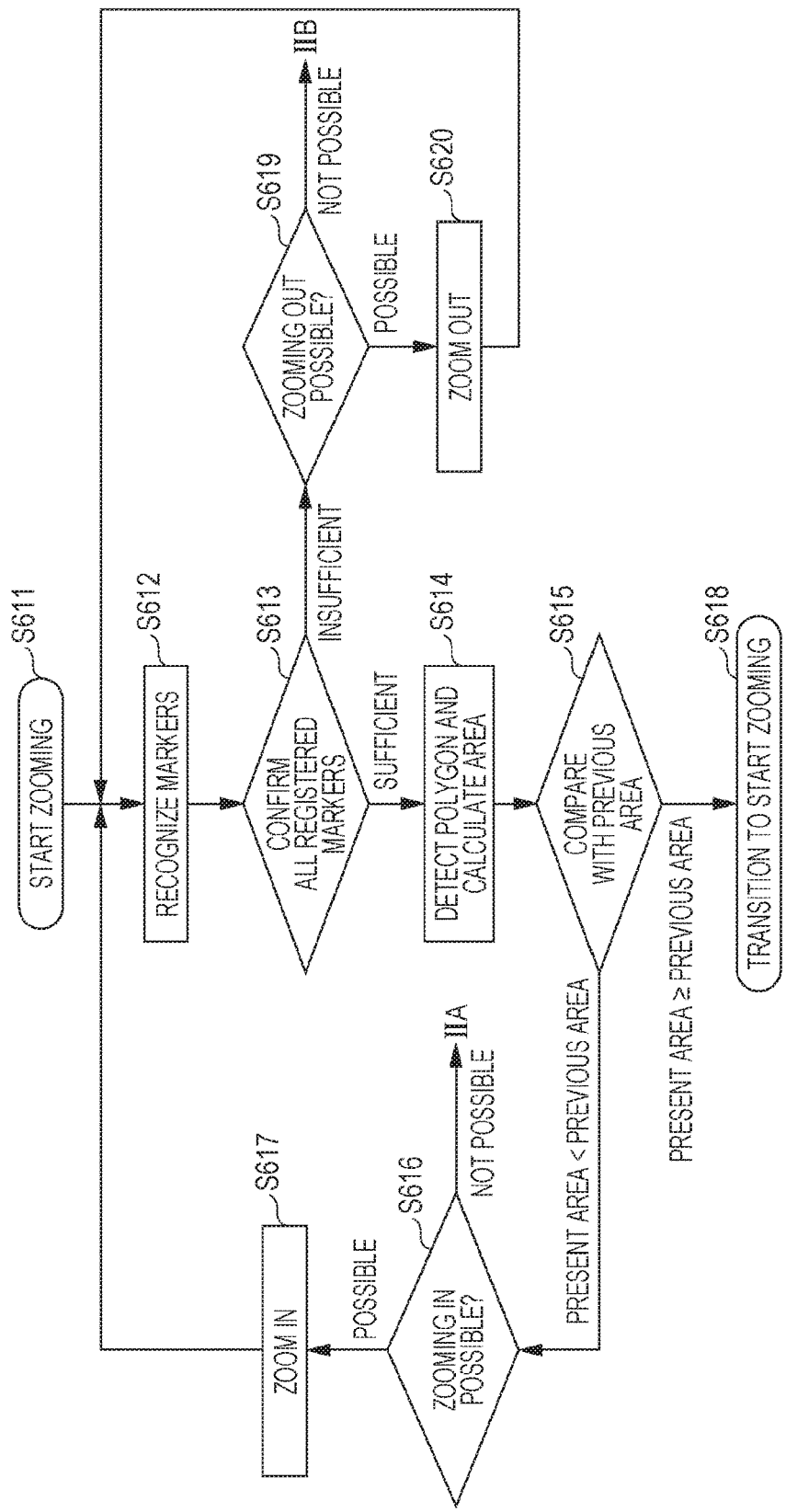
FIG. 15 is a second flowchart depicting an example of flight altitude control processing performed by the server device depicted in FIG. 11.

Next, flight altitude control processing performed by the server device 1b depicted in FIG. 11 will be described using the flowcharts of FIG. 14 and FIG. 15. FIG. 14 and FIG. 15 are first and second flowcharts depicting an example of flight altitude control processing performed by the server device 1b depicted in FIG. 11. Here, it is assumed that, by the time the unmanned aerial vehicle 2a has been raised by a manual operation of the user, the recognition-subject markers (registered markers) that serve as vertices of the polygon are already stored in the marker selection unit 18.

In FIG. 14, first, the server device 1b starts flight altitude control processing (step S601). Next, in step S602, the marker recognition unit 12 acquires the image captured by the camera 22a and recognizes markers.

Next, in step S603, the marker recognition unit 12 confirms whether or not all of the registered markers stored in the marker selection unit 18 have been recognized. When there are insufficient recognized markers, a transition is made to step S607, and the marker recognition unit 12 notifies the flight altitude control unit 15 that all of the registered markers have not been recognized, and instructs the flight altitude control unit 15 to increase the flight altitude of the unmanned aerial vehicle. The flight altitude control unit 15 controls the flight altitude of the unmanned aerial vehicle 2a according to the instruction.

On the other hand, when all of the registered markers have been recognized, a transition is made to step S604 in which the area of the polygon formed by the registered markers is calculated. In step S604, the area calculation unit 13 detects the positions of the registered markers using the image captured by the camera 22a, and obtains the area of the polygon in which the detected registered markers serve as vertices.

Next, in step S605, the maximum-value detection unit 14, which stores the area of the polygon previously calculated, compares the previous area of the polygon and the present area of the polygon calculated in step S604. When the present area of the polygon is smaller than the previous area of the polygon, a transition is made to step S606, and the maximum-value detection unit 14 notifies the flight altitude control unit 15 that the present area of the polygon is smaller than the previous area of the polygon, and instructs the flight altitude control unit 15 to decrease the altitude of the unmanned aerial vehicle 2a. The flight altitude control unit 15 controls the flight altitude of the unmanned aerial vehicle 2a in accordance with the instruction.

On the other hand, when the present area of the polygon is equal to or larger than the previous area of the polygon, the maximum-value detection unit 14 notifies the flight altitude control unit 15 that the present area of the polygon is equal to or larger than the previous area of the polygon, and the flight altitude control unit 15, while maintaining that flight altitude, transitions to step S611 depicted in FIG. 15 (step S608).

Next, in FIG. 15, the server device 1b starts adjustment processing according to the zoom ratio (step S611). Next, in step S612, the marker recognition unit 12 acquires the image captured by the camera 22a and recognizes markers.

Next, in step S613, the marker recognition unit 12 confirms whether or not all of the registered markers stored in the marker selection unit 18 have been recognized. When there are insufficient recognized markers, a transition is made to step S619, and the marker recognition unit 12 notifies the flight altitude control unit 15 that not all of the registered markers have been recognized, and the flight altitude control unit 15 determines whether or not the camera 22a can zoom out.

When it is determined that zooming out is possible, the flight altitude control unit 15 instructs the zoom ratio control unit 17 to zoom out. Next, in step S620, the zoom ratio control unit 17 instructs the camera control unit 27 to cause the lens of the camera 22a to zoom out, and the camera control unit 27 causes the lens of the camera 22a to zoom out. Thereafter, a transition is made to step S612, and the processing thereafter is continued.

On the other hand, in step S619, when the flight altitude control unit 15 has determined that zooming out is not possible, a transition is made to step S607 depicted in FIG. 14, and a switch is made to processing to alter the flight altitude of the unmanned aerial vehicle 2a by means of the flight altitude control unit 15.

Furthermore, in step S613, when all of the registered markers have been recognized, a transition is made to step S614 in which the area of the polygon formed by the registered markers is calculated. In step S614, the area calculation unit 13 detects the positions of the registered markers using the image captured by the camera 22a, and obtains, as the altitude-maintained area, the area of the polygon in which the detected registered markers serve as vertices.

Next, in step S615, the maximum-value detection unit 14, which stores the area of the polygon previously calculated, compares the previous area of the polygon (the altitude-maintained area previously calculated) and the present area of the polygon (the altitude-maintained area) calculated in step S614. When the present area of the polygon is smaller than the previous area of the polygon, a transition is made to step S616, and the maximum-value detection unit 14 notifies the flight altitude control unit 15 that the present area of the polygon is smaller than the previous area of the polygon, and the flight altitude control unit 15 determines whether or not the camera 22a can zoom in.

When it is determined that zooming in is possible, the flight altitude control unit 15 instructs the zoom ratio control unit 17 to zoom in. Next, in step S617, the zoom ratio control unit 17 instructs the camera control unit 27 to cause the lens of the camera 22a to zoom in, and the camera control unit 27 causes the lens of the camera 22a to zoom in. Thereafter, a transition is made to step S612, and the processing thereafter is continued.

On the other hand, in step S616, when the flight altitude control unit 15 has determined that zooming in is not possible, a transition is made to step S606 depicted in FIG. 14, and a switch is made to processing to alter the flight altitude of the unmanned aerial vehicle 2a by means of the flight altitude control unit 15.

Furthermore, when the present area of the polygon is equal to or larger than the previous area of the polygon, the maximum-value detection unit 14 notifies the flight altitude control unit 15 that the present area of the polygon is equal to or larger than the previous area of the polygon, and the flight altitude control unit 15, while maintaining the flight altitude of the unmanned aerial vehicle 2a, instructs the zoom ratio control unit 17 to maintain the present zoom ratio of the camera 22a, and, while the flight altitude of the unmanned aerial vehicle 2a and the present zoom ratio of the camera 22a are maintained, a transition is made to step S611, and the processing thereafter is repeated (step S618).

According to the aforementioned processing, the server device 1b recognizes, as markers, the ground-based robots selected by the user, from among the ground-based robots captured using the camera 22a mounted on the unmanned aerial vehicle 2a, and flies the unmanned aerial vehicle 2a at an altitude that enables capturing of an image in which a polygon having the markers as vertices is formed and the area of the polygon is maximized. Thereby, the flight altitude of the unmanned aerial vehicle 2a reaches the optimum altitude for capturing a region of interest as an image using the mounted camera 22a, and can appropriately capture a region of interest designated by ground-based robots selected by the user.

Furthermore, there are also cases where, due to an obstacle on the ground (a structure, a tree, or the like), the unmanned aerial vehicle 2a is unable to maintain the optimum altitude decided in the aforementioned processing. In these kinds of cases also, in the present embodiment, the server device 1b can increase the flight altitude of the unmanned aerial vehicle 2a, and, after the obstacle has been avoided, move the zoom ratio of the lens of the camera 22a to the tele side, and it is therefore possible to appropriately capture a region of interest designated by the ground-based robots selected by the user.

With the flight altitude control device and the like according to the present disclosure, it becomes possible to appropriately control the flight altitude of an unmanned aerial vehicle in order for the unmanned aerial vehicle to be flown in the air, appropriate information regarding a disaster-affected area to be captured from the unmanned aerial vehicle, and information to be shared with relevant people, when robots, people, or the like deployed on the ground are to carry out activities in a disaster-affected area at the time of a disaster or the like. Furthermore, the flight altitude control device and the like according to the present disclosure can also be applied for monitoring uses for security or the like, or maintenance uses for a dam, a bridge pier, or the like, and are therefore useful for a flight altitude control device or the like that controls the flight altitude of an unmanned aerial vehicle having mounted thereon an imaging device that captures the ground.

What is claimed is:

1. A device that controls a movement direction of an unmanned aerial vehicle having mounted thereon an imaging device that captures an image, the device comprising:
   one or more memories; and
   a processor which, in operation,
      recognizes, as a plurality of markers, a plurality of objects from the image captured by the imaging device, each of the plurality of markers attached to one of the plurality of objects,
      calculates an area of a polygon formed by the plurality of markers, and
      controls the movement direction of the unmanned aerial vehicle such that the area of the polygon is maximized.

2. The device according to claim 1, further comprising:
   a memory that stores a number of the markers to be recognized by the processor, as a registered marker number,
   wherein the processor
      compares the number of the plurality of markers and the registered marker number,
      when the number of the plurality of markers is less than the registered marker number, controls the movement direction of the unmanned aerial vehicle such that the unmanned aerial vehicle moves away from the plurality of markers.

3. The device according to claim 1, further comprising:
   a memory that stores a number of the markers to be recognized by the processor, as a registered marker number,
   wherein the processor
      compares the number of the plurality of markers and the registered marker number,
      when the number of the plurality of markers matches the registered marker number, controls the movement direction of the unmanned aerial vehicle such that the unmanned aerial vehicle moves toward the plurality of markers.

4. The device according to claim 2,
   wherein the imaging device includes a zoom imaging device capable of a zoom operation, and
   the processor,
      recognizes the plurality of objects as the plurality of markers, from the image captured by the imaging device,
      calculates, the area of the polygon formed by the plurality of markers recognized, and
      controls a zoom ratio of the zoom imaging device such that the area is maximized.

5. The device according to claim 4,
   wherein, when the number of the plurality of markers recognized is less than the registered marker number, the processor controls the zoom imaging device in such a way that the zoom imaging device zooms out.

6. The device according to claim 5,
wherein, when the zoom imaging device cannot zoom out, the processor maintains the present zoom ratio of the zoom imaging device, and controls the movement direction of the unmanned aerial vehicle such that the unmanned aerial vehicle moves away from the plurality of markers.

7. The device according to claim 4,
wherein, when the number of the plurality of markers recognized matches the registered marker number, and the area is smaller than the area previously calculated, the processor controls the zoom imaging device such that the zoom imaging device zooms in.

8. The device according to claim 7,
wherein, when the zoom imaging device cannot zoom in, the processor maintains the present zoom ratio of the zoom imaging device, and controls the movement direction of the unmanned aerial vehicle such that the unmanned aerial vehicle moves toward the plurality of markers.

9. The device according to claim 8,
wherein the processor
   acquires, as a plurality of recognition-subject markers, a plurality of objects selected by a user from among the plurality of objects,
   recognizes the plurality of recognition-subject markers as the plurality of markers, from the image captured by the imaging device, and
   calculates the area of the polygon formed by the plurality of recognition-subject markers.

10. The device according to claim 9,
wherein the processor acquires, as the plurality of recognition-subject markers, the plurality of markers selected by the user from among the plurality of markers, which are displayed superimposed on the image captured by the imaging device.

11. An unmanned aerial vehicle, comprising:
an imaging device that captures an image; and
a processor which, in operation,
   recognizes, as a plurality of markers, a plurality of objects from the image captured by the imaging device, each of the plurality of markers attached to one of the plurality of objects,
   calculates an area of a polygon formed by the plurality of markers, and
   controls a movement direction of the unmanned aerial vehicle such that the area of the polygon is maximized.

12. A method, comprising:
recognizing, as a plurality of markers, a plurality of objects from an image captured by an imaging device mounted on an unmanned aerial vehicle, each of the plurality of markers attached to one of the plurality of objects;
calculating, by a processor, an area of a polygon formed by the plurality of markers; and
controlling a movement direction of the unmanned aerial vehicle such that the area of the polygon is maximized.

13. A computer-readable non-transitory recording medium having recorded thereon a program that controls an unmanned aerial vehicle having mounted thereon an imaging device that captures an image,
wherein the program, when executed by a processor, causes the processor to execute operations including:
recognizing, as a plurality of markers, a plurality of objects from the image captured by the imaging device, each of the plurality of markers attached to one of the plurality of objects;
calculating an area of a polygon formed by the plurality of markers; and
controlling a movement direction of the unmanned aerial vehicle such that the area of the polygon is maximized.

* * * * *